Figure 3A:
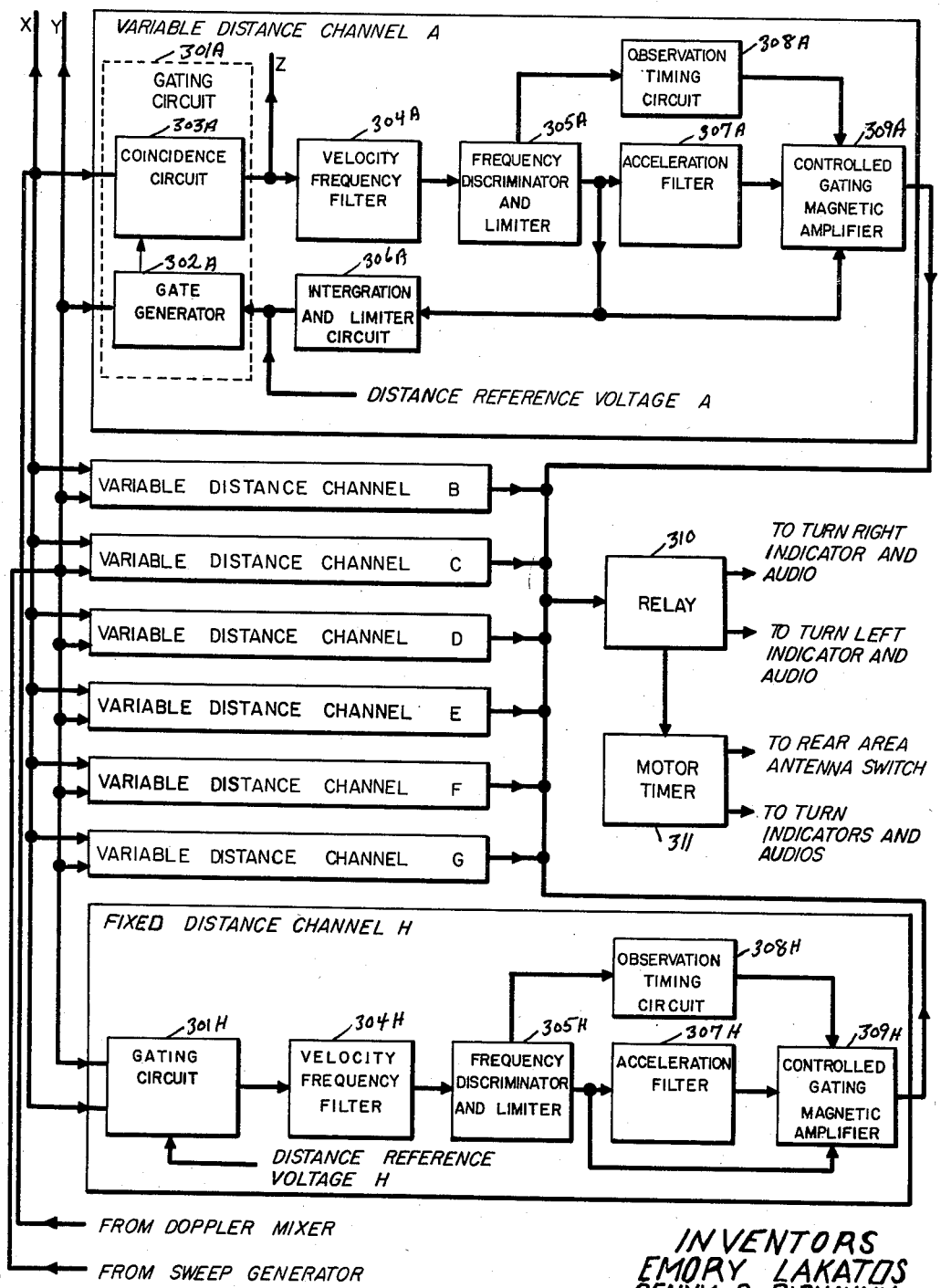

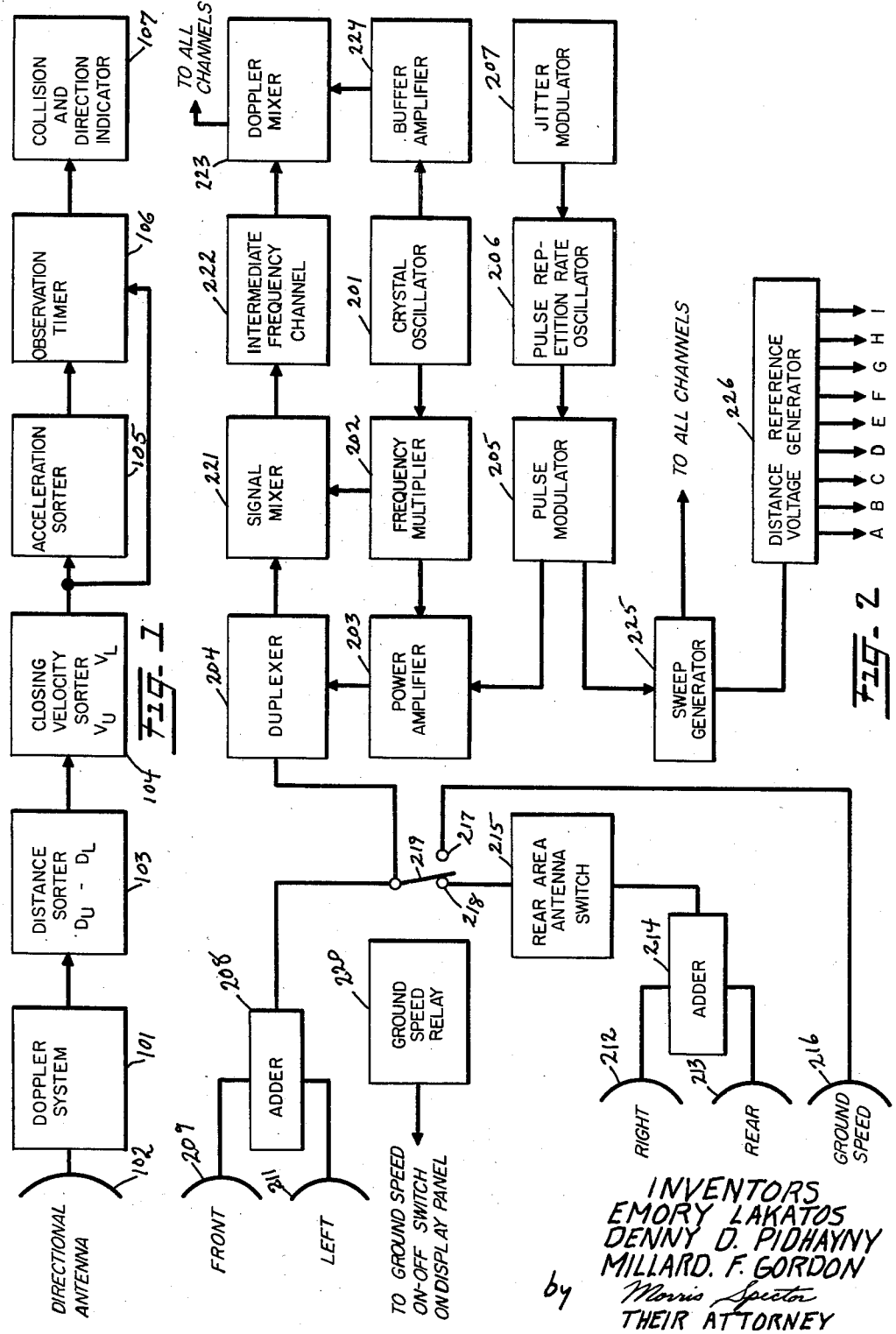

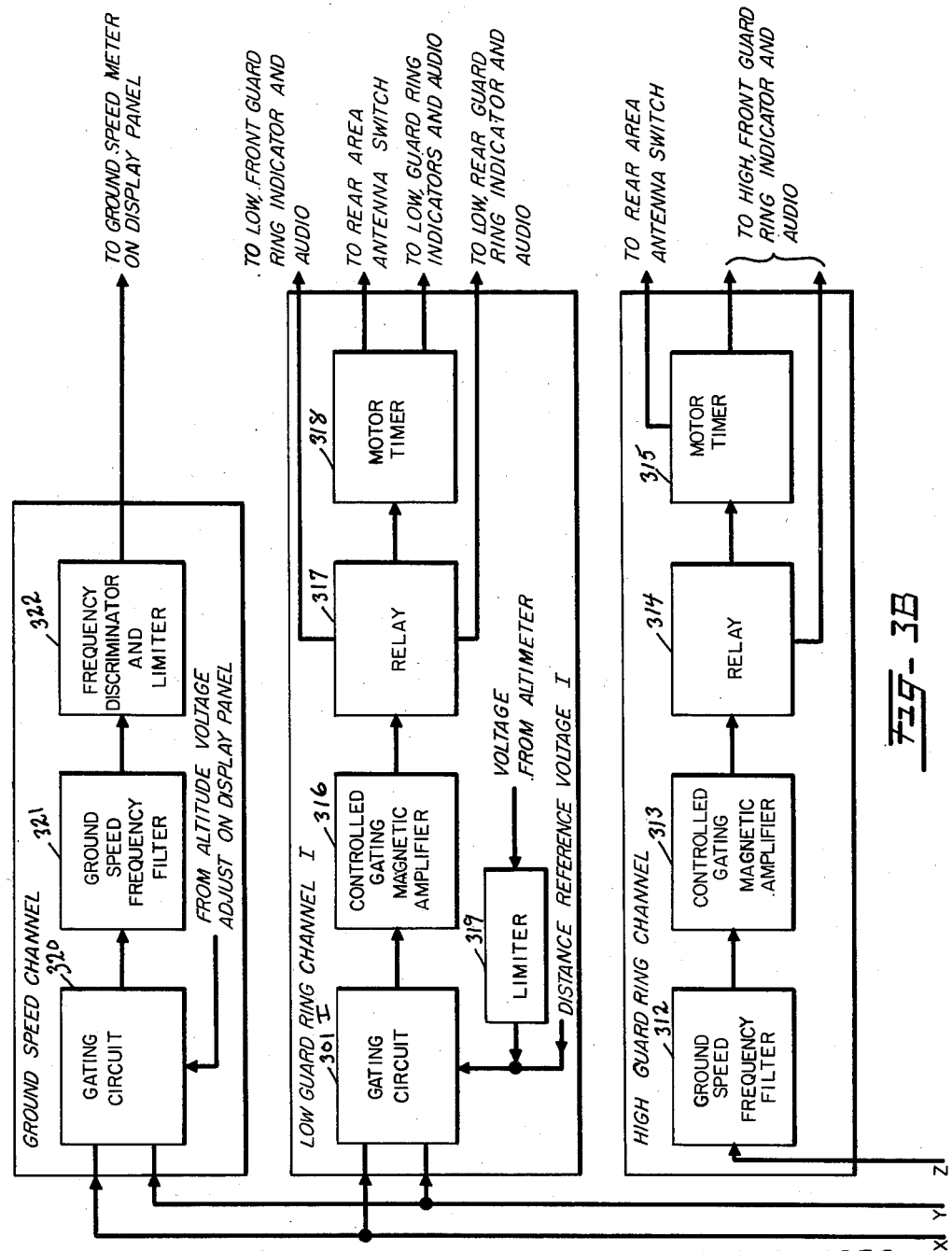

United States Patent Office 2,991,463
Patented July 4, 1961

2,991,463
COLLISION INDICATION SYSTEM
Emory Lakatos, Santa Monica, and Denny D. Pidhayny and Millard F. Gordon, Los Angeles, Calif., assignors, by mesne assignments, to Thompson Ramo Wooldridge Inc., Cleveland, Ohio, a corporation of Ohio
Filed May 28, 1956, Ser. No. 587,768
27 Claims. (Cl. 343—5)

This invention relates to a collision indication system and more particularly to such a system utilizing Doppler apparatus.

As air traffic continues to increase, the problem of collision avoidance becomes ever more acute. Daily there are reports of collisions and near misses between aircraft as landing fields and air lanes become more and more congested. With the advent of jet airliners, the already dangerous situation has become worse, since the speeds of these aircraft are such that there is even less time for a pilot to detect a collision course and take evasive action.

Despite the increase in air traffic hazards and the concern that has been expressed about the collision avoidance problem, up to this time no practical system has been devised which is capable of even approximating the requirements of an ideal collision indication system. Such an ideal system would provide complete world-wide protection against all terrain and aircraft obstacles and would possess the ability to distinguish between collision and non-collision courses in sufficient time to enable the aircraft bearing the equipment to avoid oncoming obstacles. Also, the system would be able to process information relating to more than one relatively moving object, two or more of which may constitute contemporaneous collision threats, would provide an automatic indication of the proper evasive action, and would be reliable in operation, simple in design, easy to maintain, and completely independent of equipment other than that borne by the aircraft to be protected. For the great majority of cases encountered by aircraft, the system disclosed herein will meet, or can be adapted to meet, all of the foregoing requirements.

One object of the present invention is, therefore, to provide a collision indication system which will distinguish between collision and non-collision courses in sufficient time to enable evasive action to be taken.

Another object of the present invention is to provide a collision indication system possessing the ability to process information relating to several contemporaneous collision threats.

A further object of the invention is to automatically provide information as to a proper evasive action that may be taken to avoid an oncoming object on a collision course.

Still another object of the invention is to provide a collision indication system that for a craft will be reliable in operation, simple in construction, easy to maintain, and completely independent of equipment other than that borne by the craft or vehicle to be protected.

Other objects and advantages will appear as the description of the invention proceeds.

Briefly stated, in one embodiment the present invention there is provided a novel collision indication system which sorts signals having characteristics proportional to or which are a function of the distance and the closing velocities between the system and objects moving relative thereto, closing velocity being defined as the relative velocity between the system and an object as measured along a straight line interconnecting the two. The sorting is governed by the principles that warning indications are necessary only in cases of imminent collision or dangerously close passage, and that when there is substantially no change in closing velocity between an object and the collision warning system it means that a collision or a near collision course exists. In the sorting process, the present invention provides means for separating the incoming signals associated with each object in accordance with that object's closing velocity and distance from the collision warning system. If the distances and closing velocity of the moving object fall within given ranges of distance and associated closing velocities, which together would cause the object, if on a collision course, to arrive at the system within a given time interval sufficiently long to permit successful evasive action to be taken, an indication of the danger is provided. In order to ascertain whether or not a given object is on a collision course, means are provided, in accordance with the present invention, for detecting changes in the closing velocity of the object. The indication of danger is then conditioned upon the detection of substantially no change in the closing velocity.

Figure 4:
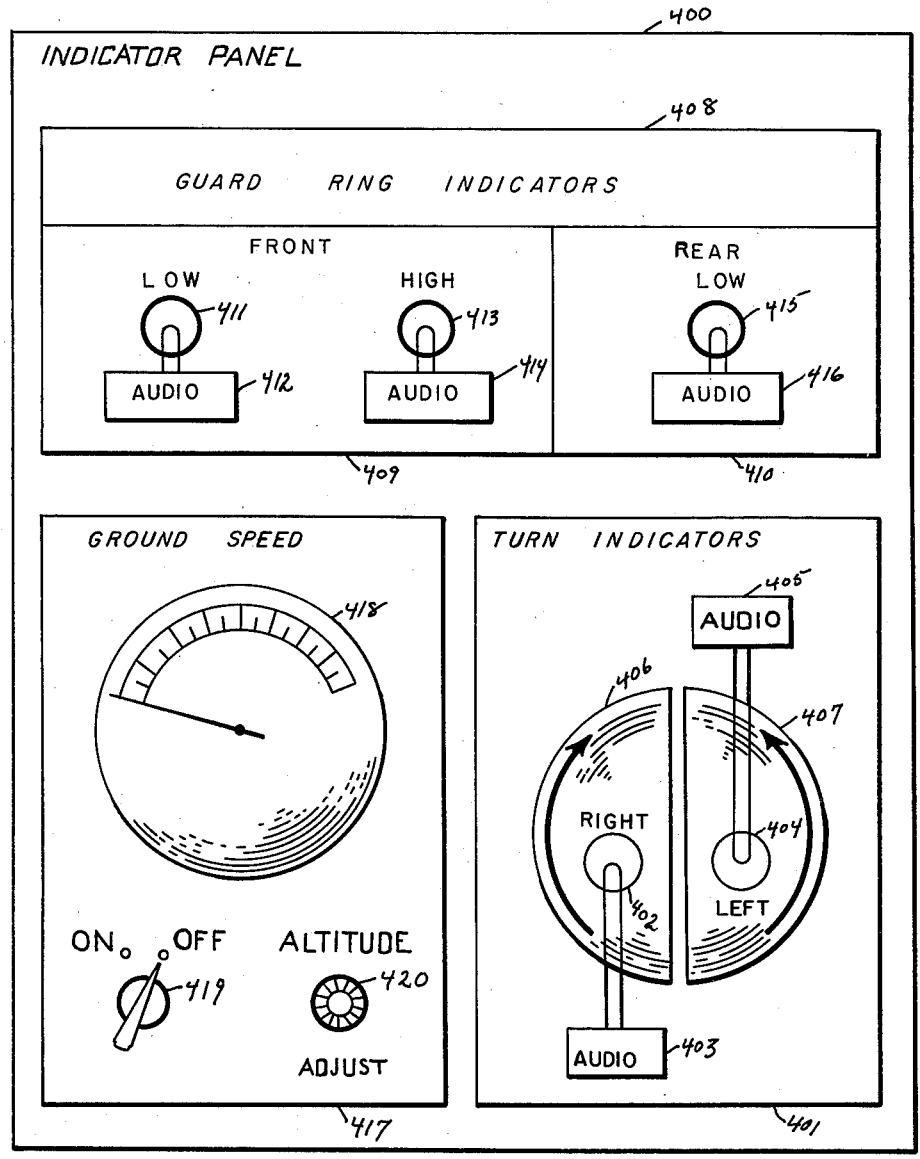

The features of this invention which are believed to be novel and patentable are pointed out in the claims which form a part of this specification. For a better understanding of the invention, reference is made in the following description to the accompanying drawings, wherein like parts are indicated by like reference numerals in which:

FIGURE 1 shows, in block diagram form, the basic elements of the collision warning system of the invention;

FIGURES 2, 3A and 3B together depict, in block diagram form, a preferred embodiment of the invention; and FIGURE 4 shows, partially in block diagram form, a pictorial representation of an instrument panel suitable for use with the embodiment of FIGS. 2, 3A and 3B.

The present invention takes advantage of the fact in a collision warning system, that in a collision warning system warnings from objects extremely remote from the system could very easily be false alarms since the objects might turn aside a considerable time before they could arrive at the system. The present invention, therefore, provides means for restricting collision warnings to only those objects that are relatively close to the system, and which therefore constitute a more immediate type of collision threat.

In a preferred embodiment of the present invention, advantage is taken of the fact that in general the most likely collision course situation is that in which a relatively close object is moving toward the system along an essentially straight line course. Signal information representative of such objects will be influenced by critical modes of relative motion to provide an indication of a potential collision. To this end, the present invention, in one of its preferred embodiments, provides an effective form of straight line prediction system which, to minimize the effects of random noise, enforces the analysis of velocity and range information over a predetermined averaging period hereinafter referred to as the observation time. Furthermore, the present invention contemplates the provision of means for accepting and processing information relative to a plurality of contemporaneous collision threats but which restricts the development of actual collision avoidance information to only that threat which constitutes the most immediate danger.

Referring now to FIG. 1, there is shown in block diagram form a simplified collision warning system exemplifying and embodying the invention. All of the elements there shown will be well understood by those skilled in the art as the specification proceeds and the general operation thereof more specifically illustrated in the other figures; therefore, they will be described in connection with FIG. 1 only in general terms. The system includes apparatus for obtaining signals having characteristics proportional to or a function of the distances and closing velocities between the collision indication system and objects moving relative thereto. For accomplishing this purpose, a suitable apparatus 101 is shown and labeled Doppler System. Such a system operates upon the principle of the Doppler effect, which states that the frequency of energy reflected directly back to an energy source from a relatively moving object will be changed by an amount proportional to the closing velocity between the source and that object. Moreover, the signals derived by the system also indicate the straight line distances between the energy source and the object moving relative thereto. Although such system could be a radar system utilizing electrical energy to derive echo signals, the present invention is not limited thereto, since other forms of energy, such as light or sound could be used in accordance with the principles of the invention.

In order to direct the energy from the Doppler system in a particular direction and receive the echo signals, a device 102 labeled Directional Antenna is provided. Elements 101 and 102 together make it possible to transmit radiant energy in a particular direction and derive echo signals from objects moving relative thereto with characteristics which are a function of or proportional to the distances and closing velocities of these objects relative thereto.

A device 103, labeled Distance Sorter, is shown connected to the Doppler system 101, and this device serves to sort the echo signals in accordance with the distances of the objects with which they are associated. In at least this sense the signals selected have a characteristic proportional to distance, and the device 103 provides signal information representing distance of the object. As indicated, it only allows signals to pass through from objects at distances lying between a range of distances, the far extremity of this range being defined by a maximum or upper distance, $D_U$, while the near extremity of the range is defined by a minimum or lower distance, $D_L$, the values of all distances being measured outwardly from the system. Connected to the output of the distance sorter is a device 104, labeled Closing Velocity Sorter, and it only permits motion indicating signal information to pass through if their characteristics indicate that they were derived from objects having closing velocities lying between a range of closing velocities defined by an upper or maximum value of closing velocity $V_U$, to a lower or minimum value of closing velocity $V_L$. To the output of sorter 104 is connected a device 105, labeled Acceleration Sorter, for only passing signals whose characteristics indicate that their associated objects exhibit substantially no change in closing velocity.

The outputs from velocity sorter 104 and acceleration sorter 105 are both coupled to a device 106 for determining the amount of time that signals entering directional antenna 102 can pass through the system; device 106 is labeled Observation Timer. This timer will only pass signals therethrough after the outputs from both acceleration sorter 105 and closing velocity sorter 104 are applied to it for a given interval of time. When this condition exists, the output of observation timer 106 is fed into an indicator device 107, which is labeled Collision and Direction Indicator.

From the foregoing description, it will be apparent that the system shown in FIG. 1 will send out signals in a particular direction and will receive time varying echo signals having characteristics indicative of the distances and closing velocities of the objects from which they were reflected. It will also be clear that only if these objects lie within a given range of distances and closing velocities, and if they also have a substantially constant closing velocity and remain within these ranges for the given time interval, will their associated signals ultimately pass through the observation timer and activate the collision and direction indicator.

Now, let it be assumed that a desired minimum warning time, $t_d$, is needed after signals pass through the system in order that a craft carrying the collision warning system may have sufficient time to turn away from the associated objects on a collision course therewith. This desired minimum warning time would have two components, a maneuver time, $t_m$, for actually turning the craft, and a reaction time, $t_r$, to enable the pilot of the craft to see the collision warning and start to turn his craft. Let it further be assumed that the given time interval introduced by observation timer 106 is an observation time of $t_o$. From the foregoing, it will be apparent that $$t_d = t_m + t_r \tag{1}$$

Now, assuming that there is a given upper closing velocity $V_U$ that is the maximum closing velocity reasonably to be expected, we calculate the upper or maximum distance extremity $D_U$ of the distance range as follows:

$$D_U = V_U(t_d + t_o) \tag{2}$$

We then determine the lower distance extremity, $D_L$, of the distance range by observing that an object traveling at velocity $V_U$ must be observed for a time at least equal to the observation time $t_o$. Hence $$D_L = D_U - V_U t_o \tag{3a}$$

Knowing the value of $D_U$ from Equation 2 and substituting same in Equation 3a, the value of $D_L$ then becomes the following equation:

$$D_L = V_U t_d \tag{3b}$$

By so fixing the upper and lower values of distance, we ensure that an object at the maximum distance $D_U$ and having a closing velocity of $V_U$ will be observed for a time $t_o$ in our collision warning system, and that our system will give a warning time of $t_d$ for all such objects. Next, we chose a value $V_L$ for the lower closing velocity as determined by the following equation:

$$V_L = KV_U \tag{4}$$

where K is a constant having a value less than one.

From the foregoing, it will be apparent that the ranges of closing velocities and distances have been so chosen that any object falling within these ranges for a time $t_o$ can only arrive at the system within a given time interval. This arrival time interval has a maximum value, $t_{max}$, when an object is at a distance $D_U$ and has a closing velocity of $V_L$. We thus find that:

$$t_{max} = D_U/V_L \tag{5}$$

and from Equations 2 and 4 we find:

$$t_{max} = V_U(t_d + t_o)/V_L = (t_d + t_o)/K \tag{6}$$

The minimum value, $t_{min}$, of this arrival time interval is obtained when an object has a closing velocity of $V_U$ and is at a distance $D_U$, since at lesser distances an object with the maximum closing velocity could not be observed for a time $t_o$ within the range of distances, as shown by Equations 2 and 3. Therefore:

$$t_{min} = D_U/V_U \tag{7}$$

and from Equation 2:

$$t_{min} = t_d + t_o \tag{8}$$

Since the signals must be observed for a time $t_o$, the maximum and minimum warning times, $W_{max}$ and $W_{min}$, are obtained by subtracting $t_o$ from Equations 6 and 8 to obtain, respectively.

$$W_{max} = (t_d + t_o)/K - t_o \tag{9}$$

and $$W_{min} = t_d \tag{10}$$

By choosing the limits of the ranges of closing velocities and distances in the above described manner, we ensure the fact that at least the desired minimum warning time will always be obtained for any object within these ranges, the maximum warning time $W_{max}$ being equal to a value greater than $t_d$, as shown by Equation 9, since the ratio between $V_L$ and $V_U$ is less than unity. From Equations 9 and 10, it can be seen that the smaller the value assigned to K the greater will be the difference between the maximum and the minimum warning times $W_{max}$ and $W_{min}$. Thus, by adjusting the value of K, the ratio $R_w$ between $W_{max}$ and $W_{min}$ may be controlled. Given a set of values for $t_d$, $t_o$ and K, this ratio $R_w$ is determined (from Equations 9 and 10) as:

$$R_w = \frac{W_{max}}{W_{min}} = \frac{t_d + t_o}{K t_d} - \frac{t_o}{t_d} \qquad (11)$$

where R is always equal to or greater than unity since K (as before) must be equal to or less than unity. On the other hand, for a given set of values for $t_d$, $t_o$ and R the value of K (from Equations 4 and 11) becomes:

$$K = \frac{t_d + t_o}{R_w t_d + t_o} = \frac{V_L}{V_U} \qquad (12)$$

Thus, with $V_U$ having been selected as the maximum closing velocity to be expected, the lowest permissible value of $V_L$, consistent with a selected maximum advanced warning time $W_{max}$, can be determined (from Equations 11 and 12) as:

$$V_L = V_U \frac{t_d + t_o}{W_{max} + t_o}$$

However, as previously pointed out, too great a warning time is undesirable and K and R should be as close to unity as is compatible with the range of closing velocities for which the system must be designed.

Now will be reviewed the operation of the collision indication system of FIG. 1. The antenna and Doppler system illuminate a given sector of space and derive from objects bearing various modes of relative motion echo signals whose characteristics are indicative of the distances and closing velocities of the objects. Due to the directivity of the antenna, signal information depicting the presence of an object embraced by a range of direction is obtainable and these signals are already sorted as to the direction of their associated objects. The various sorters now proceed to process the echo signals, only allowing those signals to pass which are associated with objects lying within a distance range $D_U$ to $D_L$, which are moving with a substantially constant closing velocity falling within the range of closing velocities from $V_U$ to $V_L$, and which are within these ranges for a time $t_o$. With K, $t_o$ and $t_d$ given, and with $V_L$, $D_U$, $D_L$ calculated as noted above, every signal passing through to the indicator will give an indication that an object will arrive at the system within a time interval from its reception of from $t_d + t_o$ to $V_U(t_d + t_o)/V_L$, thereby giving a minimum warning time of at least $t_d$.

It should be pointed out that FIG. 1 does not show the optimum system that could be devised, but it does illustrate the basic principles of the invention, namely, that using limited ranges of distances and closing velocities will minimize the effects of noise and make it possible to use an efficient predictor, and that the use of such limited ranges further eliminates needless alarms and establishes the order of priority of the threats. It should also be noted that the collision indicator could give a collision warning signal to the pilot of the craft bearing the system, or it could be used to turn the craft automatically in response to signals passing through the system.

While the embodiment shown in FIG. 1 has been useful in illustrating the basic principles of the invention, it is clearly not the optimum system that could be devised. For example, in accordance with a preferred form of the invention, means are provided for illuminating several directions and covering a wide band of closing velocities. A single Doppler radar system in common with many sorting or signal processing channels and antennas is, therefore, used for this purpose, and a simplified indicator system utilized. It is also within the purview of the present invention to provide additional elements to make the invention even more useful to craft bearing it. For example, in addition to determining whether or not an object is coming toward the system on a collision course, the operator of the craft might also want to know of the presence of any object that was either very close to the craft and moving or at a considerable distance therefrom and stationary. In addition, the ground speed of an aircraft would be useful information for the pilot of the aircraft, and some sort of audio tone signals, as well as visual signals, could be provided in order to warn of danger even when a pilot was not looking at the instrument panel. In FIGS. 2, 3A, 3B and 4, is shown a preferred embodiment of the invention which performs all of the foregoing functions with a minimum of electronic components and weight. Since all of the elements shown in these figures are either well known in the art or clearly discribed herein, they are illustrated in block diagram form so as to avoid obscuring the invention.

Referring more specifically to FIG. 2, there are shown the transmitting receiving, and antenna portions of a pulsed, Doppler radar system to be used with the preferred embodiment of the invention. Such elements are well known in the art and many other types of such devices could be used here; however, the particular transmitter shown is especially simple, and light, and, its use is considered desirable in the system. This transmitter generates pulses of radiant energy at an extremely stable frequency, and it includes a device 201 labeled Crystal Oscillator, for generating an extremely stable reference frequency. A crystal oscillator utilizing a 5670 tube for producing a 60 mc. signal output, with a crystal oven to minimize the effects of temperature change and insure temperature stability, would suffice here. One output from this oscillator is then fed into a frequency multiplier 202, such as a multi-stage exciter utilizing GL 6442 tubes. A suitable exciter would multiply the 60 mc. input thereto by 48 up to 2880 mc., and a portion of this 2880 mc. output signal would then be mixed in the exciter with the 60 mc. input signal to produce a frequency of 2940 mc. This last frequency is then amplified in a power amplifier 203 and supplied to a duplexer 204 for isolating the receiving portion of the system from the transmitting portion.

The pulses driving the power amplifier 203 are generated in a pulse modulator 205 and preferably have a duration of 0.1 $\mu$sec., and this modulator is excited by a pulse repetition rate oscillator 206 which produces 20 kc. pulses. Oscillator 206 is in turn made to vary slightly in frequency by a jitter modulator 207, in order that confusion with other craft using the system shall be minimized. Thus, it will be apparent that the output of power amplifier 203 is a series of 0.1 $\mu$sec. pulses recurring at a rate in the vicinity of 20 kc. and having a carrier frequency of 2940 mc. These pulses then pass through the duplexer 204 and through an adder 208 to a pair of antennas 209 and 211, respectively labeled Front and Left. Each of the antennas 209 and 211 will cover approximately 90° in azimuth and 15° in elevation; however, the front antenna will cover only the forward 90°, while the left antenna will cover only the left 90°, relative to the craft bearing the collision indication system. The adder device 208 serves to distribute the energy from the transmitter equally between the two antennas; however it should be understood that if a single antenna were used to cover the entire 180°, no such adder device would have to be used. The pair of antennas 209 and 211, therefore, are connected together through the adder and cover what we shall call the front area.

In covering the rear area, a similar pair of antennas, 212 for the right, and 213 for the rear, are shown and these are interconnected through an adder 214, which is in turn connected to a rear area antenna switch 215 for either blocking or passing energy to or from these antennas. A last antenna 216 is provided and labeled Ground Speed. This antenna is identical with the previously described antennas, except that it points toward the ground ahead of the craft bearing the system. Antenna 216 is connected to a switch contact 217, the rear area antenna switch 215 being connected to a switch contact 218, and there is provided a switch arm 219 which is controlled by a ground speed relay 220 and serves to connect either the rear area antenna switch 215 or the ground speed antenna 216 to the duplexer 204 through contacts 217 and 218.

Signals reflected from objects moving relative to the system will pass through the antennas, adders, and the duplexer to a signal mixer 221. These reflected signals will be at a frequency of 2940 mc. plus or minus the Doppler frequencies introduced by the closing velocities between the objects and the system. Into signal mixer 221 is also fed the 2880 mc. output from frequency multiplier 202 to be subtracted from the reflected signals, causing the output of this mixer to be 60 mc. plus or minus the Doppler frequencies. This output is then amplified in an intermediate frequency channel 222 and is then fed into a Doppler mixer 223. Also fed into the Doppler mixer is a 60 mc. signal derived from a buffer amplifier 224 into which, in turn, is fed a 60 mc. output from the crystal oscillator 201. The 60 mc. signal from the buffer amplifier will be subtracted from the intermediate frequency signal in the Doppler mixer 223, and the difference will, therefore, be a bipolar, video pulse train, the envelope of which is the Doppler frequency signal.

Referring now to the pulse modulator 205, it will be seen that it is also used to activate a sweep generator 225, for producing a linear sweep saw tooth voltage synchronous with the pulse repetition rate of 20 kc., and the output of the sweep sawtooth generator is also fed into a distance reference voltage generator 226 for producing a series of D.-C. voltages labeled A–I. The voltages from generator 226 could also be derived from any suitable source of D.-C. voltage.

From the foregoing description of FIG. 2 it will be apparent that the elements there shown will cause a train of 20 kc., 0.1 μsec. pulses, with a carrier frequency of 2940 mc., to be sent out through the various antennas. Further, any such pulses reflected from a relatively moving object will be received through the various directive antennas, amplified, and mixed with the reference frequency to produce Doppler frequency signals indicative of the closing velocities of the objects. Since a sawtooth sweep voltage is simultaneously produced in synchronism with each transmitted pulse, this sweep voltage will, therefore, serve to fix the time that a transmitted pulse was sent out by the system; and since the time between the sending out of a transmitted pulse and the reception of a reflected pulse from an object will be directly proportional to the distance of the object from which the pulse was reflected, it will be seen that the sweep voltage can be used in conjunction with the received, reflected signals to determine the distance of the object. Further, since the sweep voltage is linear, its instantaneous value will be directly proportional to distance; therefore, it is possible to use the sweep voltage to derive a series of D.-C. voltages, each of which will represent a given object distance from the system, and this is done in the distance reference voltage generator 226.

There are, then, three sets of outputs from the system shown in FIG. 2, a bipolar video pulse train containing Doppler frequencies which indicate the closing velocities of objects moving relative to the system, a sweep voltage having an amplitude directly proportional to the elapsed time between the transmitted pulses, and a series of distance reference voltages A–I, each of which has a different value and represents a given distance from the system. Therefore, all of the information needed to sort the reflected signals in accordance with the closing velocities of the objects from which they were reflected, and the distances of the objects from the collision indication system, is present in the output from the Doppler radar system shown in FIG. 2. All of this information is now transferred to the system shown in FIGS. 3A and 3B, where it is sorted and a determination of whether or not a collision course exists is made.

Referring now to FIGS. 3A and 3B, which should be considered together and are interconnected at points labeled X, Y and Z, there is shown in block diagram form a plurality of channels having transducing means for sorting the signals applied thereto. These channels include a series of variable distance channels A–G, a fixed distance channel H, a low guard ring channel I, a high guard ring channel, and a ground speed channel. Of the variable distance channels A–G, only channel A has been shown in some detail, since the others are identical, merely having different parameters.

Examining now channel A in FIG. 3A, it is designed, by way of example to track objects at distances from the collision warning system of 25,600 to 20,800 ft., and at closing velocities of 1600 to 1300 ft./sec. Included in this channel is a gating circuit 301A for passing signals only within the range of distances for which this channel is designed, and it includes a gate generator 302A for generating a range gate approximately 0.2 μsec. long, which is the equivalent of almost a 100 ft. band of distances. By passing such a small band of distances, noise is minimized. A suitable gate generator could be an ordinary blocking oscillator with a pulse forming network in its anode circuit. One input into gate generator 302A is the distance reference voltage A derived from distance reference voltage generator 226 in FIG. 2, and this voltage biases the blocking oscillator or gate generator and causes it to be normally inoperative. Another input to the gate generator 302A is the sweep voltage from sweep generator 225 in FIG. 2, and only when the sweep voltage rises to a value sufficient to overcome the bias of distance reference voltage A will the gate generator produce its 0.2 μsec. gate, the bias of voltage A being such that the initial operation of the gate will correspond to 25,600 ft.

The output gate from gate generator 302A is applied across a coincidence circuit 303A, such as a bridge circuit, and also applied across this circuit is the signal input from the Doppler mixer 223 of FIG. 2. Coincidence circuit 303A will produce an output only when a signal from the Doppler mixer is present and when a gate from its associated gate generator is also present. Upon the coincidence of these two inputs, an output is produced from the coincidence circuit and applied to a velocity-frequency filter 304A. This element is a Doppler filter designed to pass only those Doppler frequencies corresponding to 1600 to 1300 ft./sec. Since the Doppler frequency is equal to twice the closing velocity of an object divided by the wave length of the carrier, and since the carrier of the transmitter shown in FIG. 2 has a frequency of 2940 mc., or approximately one third of a foot, it will be apparent that the Doppler frequency is equal to six times the closing rate. Therefore, velocity-frequency filter 304A is so designed as to pass only signals having frequencies of between 9,600 and 7,800 c.p.s.

If the incoming signal from the Doppler mixer occurs within the proper range of distances as governed by the gating circuit, and also falls within the proper range of velocities as determined by the velocity-frequency filter, signal information passes through that filter into a frequency discriminator and limiter 305A, where it is converted into a D.-C. signal. One output of 305A is then applied back through an integration and limiter circuit 306A into gate generator 302A. The output of this integration and limiter circuit is of opposite polarity from that of distance reference voltage A, and serves to change the position of the gate generated by gate generator 302A by lowering the bias thereon, with the result that the gate will now appear sooner and thereby serve to track oncoming objects.

A second output from the frequency discriminator is applied to an acceleration filter 307A which differentiates and smooths the output from the frequency discriminator and limiter 305A so as to determine its rate of change. Since rate of change of velocity is equal to acceleration, it will be clear that the output of filter 307A will be the closing acceleration of the object relative to the collision indication system.

Another output from the frequency discriminator and limiter circuit 305A is applied to an observation timing circuit 308A for introducing a limited predetermined observation (averaging) period of at least $t_0$ into the circuit in order to minimize noise as much as possible. A suitable timing circuit would be a 3-second, one-shot multivibrator triggered by the output from circuit 305A.

Next is provided a controlled gating magnetic amplifier 309A having three input windings into which are respectively fed three signals, the output from observation timing circuit 308A, the output from acceleration filter 307A, and the output from frequency discriminator and limiter 305A. This controlled gating magnetic amplifier is so biased that it will enhance passage of a signal only when there is an imput thereto from the frequency discriminator-limiter circuit 305A (indicating the presence of a reflected signal from a moving object within the range of distances and velocities), after the signal from delay circuit 308A has terminated, and only if the output from acceleration filter 307A is substantially zero (indicating that a relatively moving object is on a collision or a near-collision course). When all of these conditions have been satisfied, amplifier 309A produces output signal information to be applied to a relay 310, which is connected to a motor timer 311.

Referring now to FIG. 4, for a moment, it will there be seen that an indicator panel 400 with a plurality of indicators is provided. There is mounted on this panel another panel labeled turn indicators 401 and including a lamp 402, across which is coupled an audio device 403, and a lamp 404, across which is coupled an audio device 405. When these lamps are lit, they respectively illuminate a pair of indicators 406 and 407, respectively labeled Right and Left. Indicator 406 provides collision avoidance signal information telling the pilot of the craft to turn right immediately, and this indicator corresponds to a warning signal from front or left antennas 209 or 211 in FIG. 2. Indicator 407 tells the pilot to turn left immediately, and corresponds to the right or rear antennas 212 or 213 of FIG. 2. On the indicator panel is also provided a panel label Guard Ring Indicators 408, and including two sections labeled Front 409, and Rear 410. The front guard ring indicator includes a lamp 411, across which is an audio device 412, for indicating a signal in the low guard ring channel, and a similar lamp 413 and audio 414 is provided in this indicator for the high guard ring channel. Another lamp 415 and similarly associated audio 416 are provided to show signals from the low guard ring channel only from the rear, since we are interested in close objects approaching from the rear; however, we are, of course, interested in near and far objects approaching from the front. Also provided on the panel is a panel label Ground Speed 417, and it includes a ground speed meter 418, a ground speed on-off switch 419, and a knob 420 labeled Altitude Adjust.

Referring back to FIG. 3A, it should be explained that with relay 310 inactive, one of its contacts connects the lamp of turn left indicator 407 and its audio 405 to one terminal of a source of potential (not shown), but their connection to the other terminal of the source of potential can be made only by motor timer 311. Now when a signal is applied to relay 310, its one contact moves to connect the lamp of turn right indicator 406 and its audio 403 to the one terminal of said potential source. Simultaneously, when a signal is applied to relay 310, it activates motor timer 311, which in turn completes the connection to the other terminal of the potential source for the lamps of both the turn right and left indicators and their audios, and also opens antenna switch 215 in FIG. 2 to disconnect the rear area antennas. Thus, with a signal present, only the turn right indicator and audio will be activated, and they will remain so only if relay 310 remains activated. Therefore, if the signal information in the collision warning system comes from either the front or left antennas, it remains when the rear area antenna switch is opened by motor timer 311, and the turn right indicator and audio remain on. However, if the signal to relay 310 disappears when the rear area antenna switch is opened, relay 310 goes back to its original position, activating the turn left indicator and audio in this position. Motor timer 311 remains in its energized position where it activates the turn indicators and opens the rear area antenna switch, for a time interval such as 15 seconds regardless of subsequent relay 310 action. The motor timer remains energized, enough time to enable the pilot to be warned of danger and turn his craft and maintain it in the turn until the motor timer resets itself, thereby closing the rear area antenna switch and disconnecting the turn indicators from the other terminal of the potential source.

It will thus be apparent that by means of this relay, motor timer, and antenna switching arrangement, it is possible to sense whether an incoming signal came from either the front or the rear areas, and the appropriate turn can be indicated. The "Rules of the Road" over airports are that if threats come from the front or left of a craft, the craft should turn to the right to avoid them; and if threats come from the right, the craft must turn to the left to avoid them. There is no rule as to threats from the rear, so it is proposed that the pilot turn to the left to avoid them. Thus, our indicator system is simplified, since only turn right and left indicators are needed to turn from threats coming from all four directions.

Variable distance channels B–G all operate in exactly the same way as channel A, except, of course, that they track objects at different ranges of distance and velocity, and each channel has its own correspondingly lettered distance reference voltage from generator 226 in FIG. 2. Thus, the range of distances of channel B is from 20,800 to 16,900 ft. at a range of closing velocities from 1300 to 1000 ft./sec.; channel C has a range of distances from 16,000 to 13,000 ft. at 1000 to 700 ft./sec.; channel D tracks objects from 11,200 to 9100 ft. at 700 to 500 ft./sec.; channel E tracks objects from 8000 to 6500 ft. at 500 to 350 ft./sec.; channel F tracks objects from 5600 to 4550 ft. at 350 to 245 ft./sec.; and channel G tracks objects from 3920 to 3185 ft. at 245 to 165 ft./sec.

A fixed distance channel H is also provided for warning of objects located from 2640 to 2145 feet and at relative velocities of 165 to 120 ft./sec. It will be noted that this channel possesses a gating circuit 301H, a velocity-frequency filter 304H, a frequency discriminator-limiter 305H, an acceleration filter 307H, an observation timing circuit 308H, and a controlled gating magnetic amplifier 309H. All of these elements operate in ways similar to their correspondingly numbered elements in channel A; however, channel H is designed to operate at different closing velocities and distances than channel A and has its own distance reference voltage H applied to its own gating circuit. The main difference between this channel and the variable distance channels A–G is that there is no feedback from the output of frequency discriminator-limiter 305H back to the gating circuit 301H. This means that the gate output from the gating circuit of this channel will remain at a fixed distance. In order to cover the desired range of distance, the gate produced by gating circuit 301H is a 1 μsec. gate, in contrast to the 0.2 μsec. gates of the variable distance channels. Such a 1 μsec. gate will cover an approximate distance range of 495 feet, and since no further distance range is desired, the gate need not be variable.

Further examining FIG. 3B, it will be seen that a high guard ring channel is provided in order to give an indication to the pilot of the craft whenever any stationary object is within a distance of 25,600 ft. to the front of the craft. This channel includes a ground speed-frequency filter 312 for passing only signals with Doppler frequencies corresponding to the speed of the craft relative to the earth's surface, thereby eliminating signals from objects to the left of the craft. Connected to the output of this filter is a controlled gating magnetic amplifier 313, for activating a relay 314 whenever a signal is applied thereto, and this relay in turn activates a motor timer 315. Relay 314 and motor timer 315 operate exactly like relay 310 and 311 in order to open the rear area antenna switch so as to determine which group of antennas the signal is coming from. However, since an indication need only be provided for distant objects in front of the plane, relay 314 and motor timer 315 are connected to only a single, front, high guard ring indicator and audio to give warnings of objects in front of the craft only.

The input to the ground speed-frequency filter 312 is obtained from the output of gating circuit 301A in FIG. 3A, as shown by connection Z—Z between FIGS. 3A and 3B. This means that the input gate to this filter may vary from 25,600 to 20,800 ft., but at those distances, such a variation in unimportant to the pilot of the craft. The pilot need only be certain that all stationary objects within a distance of 25,600 ft. to the front of the craft will show up on the high front guard ring indicator, and he is not concerned with the fact that the indication may occur at other than 25,600 feet or, if it does occur at 25,600 feet, may continue for all or a part of the 4800 ft. of progress toward the object. Therefore, by using the gating circuit of channel A, an extra gating circuit for the high guard ring channel can be omitted, with a consequent saving in weight.

More specifically, in the event a fixed object appears on the scene at substantially the same time as a moving object whose distance from the indication system and closing velocity relative thereto fall within the ranges and closing velocities associated with channel A, the system will indicate the presence of the fixed object notwithstanding the fact that channel A is set into operation and therefore tracks the moving object. The reliability of the system in this respect is due to the fact that, when compared to the gate pulses produced by gate generator 302A, the echo pulses received from fixed objects are of unusually long duration. Consequently, even though the train of gate pulses is precessed during the tracking period, there will be at least one instance when the echo pulse will coincide in time with a gate pulse. Accordingly, at some point between 20,800 feet and 25,600 feet, an echo signal will assuredly pass through coincidence circuit 303A to ground speed frequency filter 312 and an indication will be given of the presence of the fixed object. On the other hand, the precessing of the gate pulse train may produce a continuous indication, as previously mentioned.

There is also provided in FIG. 3B a low guard ring channel I for indicating the presence of any object at any speed within 750 ft. of the craft bearing the collision warning system. This channel includes a gating circuit 301I for providing a 0.1 μsec. gate, a controlled gating magnetic amplifier 316, a relay 317, and a motor timer 318. Into the gating circuit is fed the distance reference voltage I from the distance reference voltage generator 226 in FIG. 2, for fixing the start of the gate at a distance of approximately zero feet. Since the transmitted pulses each have a duration 0.1 μsec., or approximately 50 ft. of distance, no signal reflected from an object within 50 ft. could pass through duplexer 204 in FIG. 2, so no ground signal will pass through this channel when the craft is on the ground.

In order to eliminate ground clutter when the aircraft is close to the ground, there is also fed into the gating circuit, through a limiter 319, an output voltage from an electrical altimeter (not shown), that is usually present on aircraft. This altimeter voltage eliminates false alarms due to ground clutter when the craft is close to the ground by delaying the gate start by an amount directly proportional to the altitude of the aircraft, up to an altitude of 700 ft. As soon as the aircraft rises above 700 ft., due to limiter 319, the altimeter voltage has no further effect. Thus, as the aircraft rises above the ground, no ground object will be indicated, until at 700 ft. the 50 ft. gate will provide a warning of any object between 700 and 750 ft. of the craft. It will be noted that no velocity-frequency filter is provided, so that the presence of any object within 700 to 750 ft. of the craft, no matter what its closing velocity may be, will pass through the gating circuit and activate controlled gating magnetic amplifier 316. Upon activation of amplifier 316, it proceeds to operate relay 317 and motor timer 318, and they operate in the same manner as relay 310 and motor timer 311 to sense the antenna combination from which the incoming signal was derived. The information is then transmitted to the guard ring indicator panel 408 in FIG. 4, where the low front indicator 411 and audio 412, and the low rear indicator 415 and audio 416 are provided in order to indicate to the pilot of the craft the presence and direction of an object within approximately 750 ft. of the craft.

The last channel that is provided is a ground speed channel. This channel includes a gating circuit 320 connected to a ground speed-frequency filter 321, which is in turn connected to a frequency discriminator and limiter 322. The output of this last element is fed to the ground speed meter 418 on the display panel shown in FIG. 4. The gate produced by gating circuit 320 will appear at a time determined by the altitude-adjust control 420 in FIG. 4, this control being connected to the gating circuit for this reason.

In operation, when the pilot of the craft wishes to measure his ground speed, he moves switch 419 in FIG. 4 to its "on" position, serving to actuate ground speed relay 220 in FIG. 2 and move relay contact 219 from switch contact 218 to switch contact 217, thereby connecting the ground speed antenna 216 to the duplexer 204 and disconnecting the rear area antennas from the duplexer. Since ground speed antenna 216 is directed toward the ground, it will pick up signals reflected from the earth, and these will be amplified in the receiving portions of FIG. 2 and fed into the channels of FIG. 3. The pilot disregards all collision warning indications while he is measuring ground speed. Ground speed-frequency filter 321 permits the signals to come through only when they are within the range of closing velocities at which the craft was designed to travel, and frequency discriminator-limiter 322 proceeds to convert the signals to direct-current and feed them to the ground speed meter 418 of FIG. 4. The pilot of the craft varies the altitude-adjust control 420 on his instrument panel shown in FIG. 4 until his ground speed reads a maximum, this variation being necessary in order to compensate for the altitude of the craft.

It will be seen from the foregoing that a collision indication system has been provided that will indicate the presence of all objects heading in a collision course toward a craft bearing the system and having closing velocities lying within a band of closing velocities from 120 and 1600 ft./sec., provided that these objects are between 2145 and 25,600 ft. from the craft. Further, this system will indicate the presence of any object, regardless of its relative velocity, located at approximately 750 ft., or stationary objects 25,600 ft. from the front of the craft. Also, the pilot of the craft will be told in which direction to turn to avoid the threat, and can also obtain the ground speed of the craft with very little effort. Moreover, utilizing three regulated, chopper-type, magnetic amplifier power supplies, and transistors, and multi-purpose tubes whenever possible, the system of the invention as shown in FIGS. 2, 3, and 4, exclusive of the antennas, will weigh only 78 pounds and can be contained in a volume of 0.84 cu. ft. Therefore, this collision warning system accomplishes all of the objects previously set forth.

A word should now be said as to how the various ranges of distance and velocity were obtained. It was first determined that an aircrft making a 10-second turn to the right away from objects approaching from the left or front, and to the left from objects approaching from the right or rear, at an acceleration of twice that of gravity (2 $g$), would clear the oncoming objects by a minimum of 800 ft.; and if the turn were made at 0.6 $g$ for 10 seconds, the clearance would always be at least 100 ft. With regard to channel A, it was decided that the maximum closing velocity that might reasonably be encountered in normal conditions of aircraft flight, $V_U$, was 1600 ft./sec., corresponding to almost 1100 miles per hour. Then, since there was a 3-second observation time, $t_o$, in the equipment, since a 3-second pilot reaction time, $t_r$, was desired as a safety factor, and since a 10-second interval, $t_m$, was needed to turn the craft, the maximum distance, $D_U$, was determined from Equations 1 and 2 by multiplying 1600 ft./sec. by 16 seconds, to arrive at 25,600 ft. The lower distance, $D_L$, was determined from Equations 1 and 3 by multiplying 13 seconds by the maximum velocity of 1600 ft./sec. to arrive at 20,800 ft. At that distance a minimum warning time of 13 seconds was obtained at the maximum closing velocity. Now, bearing in mind that the smaller the range of closing velocities was, the better the signal-to-noise ratio would be, a lower closing velocity, $V_L$, was chosen at 1300 ft./sec., resulting in a Doppler frequency range of 9600 c.p.s. to 7800 c.p.s. for this channel.

This lower closing velocity of 1300 ft./sec. now became the upper closing velocity, $V_U$, of channel B, and the entire process was repeated for this channel to arrive at the values noted above. The process was again repeated for channels C to H. However, in no instance was the K of Equation 4 less than 0.7 when the lower closing velocities were determined. Thus the entire band of closing velocities from 120 ft./sec. to 1600 ft./sec. was continuously covered, insuring that no object within that band would be overlooked by the collision warning system. Further, each channel only passed signals from objects on collision courses that would arrive at the collision warning system within minimum time of 16 seconds to a maximum time of 25.8 seconds after their signals arrived at the system, thereby ensuring that noise was minimized and that the warning times were the desired minimum of 13 seconds.

Although the system shown in FIGS. 2, 3A, 3B and 4 distinguishes between objects having closing velocities directed toward the system from those directed away from the system by having tracking gates which only can follow oncoming objects, other ways of distinguishing such objects are possible. For example, the acceleration sorting circuits shown in FIGS. 1 and 3 could be so biased as to pass only signals corresponding to oncoming objects. Thus in a modified system in which the distance gates were fixed in position, such a biased acceleration sorter would be useful. Further, since the number of oncoming objects is so much greater than the number of receding objects, a fixed gate system that failed to distinguish between such objects would also be a useful one.

The presently disclosed system may also be modified in numerous other ways so long as the principles previously outlined are followed. For example, the number of channels used could be varied, either the ranges of closing velocities or the ranges of distances could be overlapping or contiguous, the observation or averaging time, $t_o$, of each channel could be different, the various gates could have differing durations, etc.

Many such changes in the elements and parameters of the various channels could be made, provided only that every object on a collision course within the desired band of closing velocities is indicated in sufficient time to avoid it, and that noise is sufficiently minimized so that a usable signal can be obtained.

Further, although all of the antennas shown in this disclosure are continuously illuminated, this is not essential to the invention, since they could be sequentially illuminated, or one antenna could be continuously illuminated and the others sequentially illuminated where it was desired to guard against some special danger from one direction. Moreover, it should be understood that many types of antennas could be used other than those described herein. Also, any number of antennas could be used, or if danger was anticipated in one particular direction, only one antenna would conceivably be necessary. Possibly also, a single rotating antenna covering all directions could be used. However, where either sequential scanning or a rotating antenna is used, the switching or rotating speed would have to be rapid enough to insure against an object in any direction slipping through a range of closing velocities undetected when the other directions were being illuminated.

It should be understood that the present invention is not limited to aircraft, since land vehicles will also find it useful, and that the disclosed system could use the collision indication signal to turn the craft automatically, where this service was desired.

It should also be understood that the observation timing circuits shown in FIGS. 1 and 3 could be replaced by switching devices, well known in the art, which would only permit the antennas to transmit energy for limited time intervals, provided that these intervals gave sufficient averaging time to obtain a usable signal. Similarly, many of the other elements described in the foregoing could be replaced, but these and the many other variations that may occur to those skilled in the art will not alter the basic principles of the invention; and it is these principles which have made it possible to meet, practically speaking, all of the requirements previously noted and provide, for the first time, a practical, useful collision indication system.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What we claim as new and desire to secure by Letters Patent of the United States is:

1. In a system for selectively producing a warning signal denoting a substantial threat of a collision between a maneuverable craft and one of a plurality of different objects from which emanate detectable time varying wave energy, under conditions where the velocities and distances of the objects, relative to said craft, are conditionally different and a specified advanced warning time is desired in order to allow successful execution of an evasion action for avoiding a threatened collision, the combination of: first means for detecting the wave energy emanated by said objects and transducing said detected energy into corresponding electrical signals each of which has detectable time varying characteristics which change in accordance with the magnitudes of relative velocity and distance between the craft and corresponding objects closing on said craft, said first means having known distance detection limits in its ability to detect said wave energy; second means coupled to said first means and selectively responsive to said detectable characteristics of said electrical signals for producing a control signal only in response to the occurrence of an electrical signal whose detectable time varying characteristics correspond to a combination of closing velocity and distance magnitudes in which the quotient of the distance magnitude divided by the velocity magnitude is substantially no less than the magnitude of the specified desired advanced warning time and the distance magnitude of said combination is substantially less than said known distance detection limits of said first means; and means coupled to said second means and responsive to said control signal for developing an output signal only upon the occurrence of said control signal whereby said output signal denotes a substantial threat of collision between the craft and an object.

2. In a system for selectively producing a warning signal denoting a substantial threat of a collision between a maneuverable craft and one of a plurality of different objects from which emanate detectable time varying wave energy, under conditions where the velocities and distances of the objects, relative to said craft, are conditionally different, the combination of: first means for detecting the wave energy emanated by said objects and transducing said detected energy into corresponding electrical signals each of which has detectable time varying characteristics which change in accordance with the magnitudes of relative velocity and distance between the craft and corresponding objects closing on said craft; second means coupled to said first means and selectively responsive to said detectable characteristics of said electrical signals for producing a control signal only in response to the occurrence of an electrical signal whose detectable time varying characteristics correspond to a combination of substantially constant velocity and decreasing distance magnitudes; and means coupled to said second means and responsive to said control signal for developing an output signal only upon the occurrence of said control signal whereby said output signal denotes a substantial threat of collision between the craft and an object.

3. In a system for selectively producing a warning signal denoting a substantial threat of a collision between a maneuverable craft and one of a plurality of different objects which emanate detectable time varying wave energy, under conditions where the velocities and distances of the objects, relative to said craft, are conditionally different, the combination of: first means for detecting the wave energy emanated by said objects and transducing said detected energy into corresponding electrical signals each of which has detectable time varying characteristics which change in accordance with the magnitudes of relative velocity and distance between the craft and corresponding objects closing on said craft; second means coupled to said first means and selectively responsive to the detectable characteristics of said electrical signals for producing a first output signal only in response to the occurrence of an electrical signal whose detectable characteristics correspond to a magnitude of decreasing distance falling within a specified limited range of distance magnitudes; third means coupled to said first means and selectively responsive to the detectable characteristics of said electrical signals for producing a second output signal only in response to the occurrence of an electrical signal whose detectable characteristics correspond to a magnitude of velocity falling within a specified limited range of velocity magnitudes; means operatively coupled to both said second and said third means and responsive to both said first and second output signals for developing a third output signal only upon at least partial time coincidence between said first and said second output signals whereby said third output signal denotes a substantial threat of collision between the craft and an object.

4. In a system for selectively producing a warning signal denoting a substantial threat of a collision between a maneuverable craft and one of a plurality of different objects from which emanate detectable time varying wave energy, under conditions where the velocities and distances of the objects, relative to said craft, are conditionally different, the combination of: first means for detecting the wave energy emanated by said objects and transducing said detected energy into corresponding electrical signals each of which has detectable time varying characteristics which change in accordance with the magnitudes of relative velocity and distance between the craft and corresponding objects closing on said craft; second means coupled to said first means and selectively responsive to the detectable characteristics of said electrical signals for producing a first output signal only in response to the occurrence of an electrical signal whose detectable characteristics correspond to a magnitude of decreasing distance falling within a specified limited range of distance magnitudes; third means coupled to said first means and selectively responsive to the detectable characteristics of said electrical signals for producing a second output signal only in response to the occurrence of an electrical signal whose detectable characteristics correspond to a magnitude of velocity falling within a specified limited range of velocity magnitudes; fourth means operatively coupled to both said second and said third means and responsive to both said first and said second output signals for producing a third output signal only upon at least partial time coincidence between said first and said second output signals; and signal responsive timing means operatively coupled to said fourth means and responsive to said third output signal for producing a warning signal only in response to the continued duration of said third signal for a period of time determined by said timing means.

5. In a system for selectively producing a warning signal denoting only those substantial threats of collision, between a maneuverable craft and one of a plurality of different objects, which continues for a predetermined time of observation $t_o$ under conditions where the objects emanate detectable time-varying wave energy and the velocities and distances of the objects relative to said craft are conditionally different and where a specified advanced warning time $t_d$ is desired in order to allow successful execution of an evasion action for avoiding a threatened collision, the combination of: first means for detecting the wave energy emanated by said objects and transducing said detected energy into corresponding electrical signals, each of which has detectable time-varying characteristics which change in accordance with the magnitudes of relative velocity and distance between the craft and a corresponding object closing on said craft; second means coupled to said first means and selectively responsive to the detectable characteristics of said electrical signals for producing a first output signal only in response to those of said electrical signals whose detectable characteristics correspond to a magnitude of decreasing distance falling within a specified limit of range magnitudes, the upper limit $D_U$ of said range being substantially equal to $V_U(t_d+t_o)$, while the lower limit $D_L$ of said range being substantially equal to $V_U t_d$, the values of $V_U$, $V_L$, $D_U$ and $D_L$ being such that the quotient produced by dividing $D_U$ by $V_U$ is substantially equal to the quotient produced by dividing $D_L$ by $V_L$ with each of these quotients being substantially equal to $t_d+t_o$; third means coupled to said first means and selectively responsive to the detectable characteristics of said electrical signals for producing a second output signal only in response to at least one of said electrical signals having detectable characteristics corresponding to a magnitude of velocity falling within a specified limited range of velocity magnitudes, the upper limit range being $V_U$, while the lower limit of said range is $V_L$; fourth means operatively coupled to both said second and third means and responsive to both said first and said second output signals for producing a third output signal only upon at least partial time coincidence between said first and second output signals; and signal responsive timing means operatively coupled to said fourth means and responsive to said third output signal to produce a warning signal only in response to the continuation of said third signal for a period of time determined by said timing means substantially equal to $t_o$ as determined by said timing means.

6. A system for selectively producing a warning signal denoting the threat of a collision between a maneuverable craft and one of a plurality of different objects from which emanate detectable time varying wave energy, under conditions where the velocities and distances of the objects, relative to said craft, are conditionally different and the maneuverability of the craft is such that a specified advanced warning time is desired in order to allow successful execution of an evasion action for avoiding a threatened collision, the combination of: first means for detecting the wave energy emanated by said objects and transducing said detected energy into corresponding electrical signals each of which has detectable time varying characteristics which change in accordance with the magnitudes of relative velocity and distance between the craft and corresponding objects closing on said craft; said first means having known distance detection limits in its ability to detect said wave energy; second means coupled to said first means and selectively responsive to said detectable characteristics of said electrical signals for producing time varying first output signal only in response to at least one electrical signal whose detectable characteristics correspond to a magnitude of decreasing distance falling within a specified limited range of distance magnitudes; third means coupled to said second means and selectively responsive to the detectable charateristics of said electrical signals for producing a time varying second output signal only in response to said first time varying output signal having characteristics corresponding to the actual magnitude of velocity denoted by said at least one electrical signal; said magnitude of velocity falling within a specified limited range of velocity magnitudes; fourth means coupled to said third means and selectively responsive to the detectable characteristics of said second output signal for producing a third output signal only in response to the occurrence of an electrical signal whose detectable characteristics correspond to a substantially changing velocity magnitude and; fifth means coupled to said third and fourth means for response to the presence of said second output signal and the absence of said third output signal to provide a warning signal whereby said warning signal denotes a threat of collision between the craft and an object.

7. A system for selectively producing a warning signal denoting the threat of a collision between a maneuverable craft and one of a plurality of different objects from which emanate detectable time varying wave energy, under conditions where the velocities and distances of the objects, relative to said craft, are conditionally different and the maneuverability of the craft is such that a specified advanced warning time is desired in order to allow successful execution of an evasion action for avoiding a threatened collision, the combination of: first means for detecting the wave energy emanated by said objects and transducing said detected energy into corresponding electrical signals each of which has detectable time varying characteristics which change in accordance with the magnitudes of relative velocity and distance between the craft and corresponding objects closing on said craft; said first means having known distance detection limits in its ability to detect said wave energy; second means coupled to said first means and selectively responsive to said detectable characteristics of said electrical signals for producing time varying first output signal only in response to at least one electrical signal whose detectable characteristics correspond to a magnitude of decreasing distance falling within a specified limited range of distance magnitudes; third means coupled to said second means and selectively responsive to the detectable characteristics of said electrical signals for producing a time varying second output signal only in response to said first time varying output signal having characteristics corresponding to the actual magnitude of velocity denoted by said at least one electrical signal; said magnitude of velocity falling within a specified limited range of velocity magnitudes; signal responsive timing means operatively coupled to said third means and responsive to said second output signal for providing an observation timing output signal only in response to the continued duration of said second output signal for a period of time duration determined by said timing means; fourth means coupled to said third means as selectively responsive to the detectable characteristics of said second output signal for producing a third output signal only in response to the occurrence of an electrical signal whose detectable characteristics correspond to a substantially changing velocity magnitude and; fifth means coupled to said third, fourth and timing means for response to the presence of said second output and timing output signals and the absence of said third output signal to provide a warning signal whereby said warning signal denotes a threat of collision between the craft and an object.

8. In a system for selectively producing a warning signal denoting only those substantial threats of collision, between a maneuverable craft and one of a plurality of different objects, which continues for a predetermined time of observation $t_o$ under conditions where the objects emanate detectable time-varying wave energy and the velocities and distances of the objects relative to said craft are conditionally different and where a specified advanced warning time $t_d$ is desired in order to allow successful execution of an evasion action for avoiding a threatened collision, the combination of: first means for detecting the wave energy emanated by said objects and transducing said detected energy into corresponding electrical signals, each of which has detectable time-varying characteristics which change in accordance with the magnitudes of relative velocity and distance between the craft and a corresponding object closing on said craft; second means coupled to said first means and selectively responsive to the detectable characteristics of said electrical signals for producing a first output signal only in response to those of said electrical signals whose detectable characteristics correspond to a magnitude of decreasing distance falling within a specified limit of range magnitudes, the upper limit $D_U$ of said range being substantially equal to $V_U(t_d+t_o)$, while the lower limit $D_L$ of said range being substantially equal to $V_U t_d$, the values of $V_U$, $V_L$, $D_U$ and $D_L$ being such that the quotient produced by dividing $D_U$ by $V_U$ is substantially equal to the quotient produced by dividing $D_L$ by $V_L$ with each of these quotients being substantially equal to $t_d+t_o$; third means coupled to said first means and selectively responsive to the detectable characteristics of said electrical signals for producing a second output signal only in response to at least one of said electrical signals having detectable characteristics corresponding to a magnitude of velocity falling within a specified limited range of velocity magnitudes, the upper limit range being $V_U$, while the lower limit of said range is $V_L$; fourth means coupled to said third means and selectively responsive to the detectable characteristics of second output signal for producing a third output signal only in response to the occurrence of an electrical signal whose detectable characteristics correspond to a substantially changing velocity magnitude; fifth means operatively coupled to both said second and third means and responsive to both said first and second output signals and coupled to said fourth means for response to said third output signals for producing a fourth output signal only upon at least partial time coincidence between said first and second output signals and only in response to the absence of said third output signals; and signal responsive timing means operatively coupled to said fifth means and responsive to said fourth signal output to produce a warning signal only in response to the continuation of said fourth output signal for a period of time determined by said timing means substantially equal to $t_o$ as determined by said timing means.

9. In a system for selectively producing a warning signal denoting only those substantial threats of collision, between a maneuverable craft and one of a plurality of different objects, which continues for a predetermined time of observation $t_o$ under conditions where the objects emanate detectable time-varying wave energy and the velocities and distances of the objects relative to said craft are conditionally different and where a specified advanced warning time $t_d$ is desired in order to allow successful execution of an evasion action for avoiding a threatened collision, the combination of: first means for detecting the wave energy emanated by said objects and transducing said detected energy into corresponding electrical signals, each of which has detectable time-varying characteristics which change in accordance with the magnitudes of relative velocity and distance between the craft and a corresponding object closing on said craft; variable distance means coupled to said first means and selectively responsive to the detectable characteristics of said time varying electrical signals for producing a first output signal only in response to those of said electrical signals whose detectable characteristics correspond to a magnitude of decreasing distance falling within a specified limit of range magnitudes, the upper limit $D_U$ of said range being substantially equal to $V_U(t_d+t_o)$, while the lower limit $D_L$ of said range is substantially equal to $V_U t_d$, the values of $V_U$, $V_L$, $D_U$ and $D_L$ being such that the quotient produced by dividing $D_U$ by $V_U$ is substantially equal to the quotient produced by dividing $D_L$ by $V_L$ with each of these quotients being substantially equal to $t_d+t_o$; third means coupled to said first means and selectively responsive to the detectable characteristics of said time varying electrical signals for producing a second output signal only in response to at least one of said electrical signals having detectable characteristics corresponding to a magnitude of velocity falling within a specified limited range of velocity magnitudes, the upper limit of said range being $V_U$, while the lower limit of said range is $V_L$; fourth means coupled to said third means and responsive to the time varying second output signal for controlling said variable distance means between its upper limit $D_U$ and lower limit $D_L$; fifth means operatively coupled to said second and third means and responsive to said first and second output signals for producing a third output signal only upon at least partial time coincidence between said first and second output signals; and signal responsive timing means operatively coupled to said fifth means and responsive to said third output signal to produce a warning signal only in response to the continuation of said third output signal for a period of time substantially equal to $t_d$ as determined by said timing means.

10. In a system for selectively producing a warning signal denoting only those substantial threats of collision, between a maneuverable craft and one of a plurality of different objects, which continues for a predetermined time of observation $t_o$ under conditions where the objects emanate detectable time-varying wave energy and the velocities and distances of the objects relative to said craft are conditionally different and where a specified advanced warning time $t_d$ is desired in order to allow successful execution of an evasion action for avoiding a threatened collision, the combination of: first means for detecting the wave energy emanated by said objects and transducing said detected energy into corresponding electrical signals, each of which has detectable time-varying characteristics which change in accordance with the magnitudes of relative velocity and distance between the craft and a corresponding object closing on said craft; variable distance means coupled to said first means and selectively responsive to the detectable characteristic of said time varying electrical signals for producing a first output signal only in response to those of said electrical signals whose detectable characteristics correspond to a magnitude of decreasing distance falling within a specified limit of range magnitudes, the upper limit $D_U$ of said range being substantially equal to $V_U(t_d+t_o)$, while the lower limit $D_L$ of said range is substantially equal to $V_U t_d$, the values of $V_U$, $V_L$, $D_U$ and $D_L$ being such that the quotient produced by dividing $D_U$ by $V_U$ is substantially equal to the quotient produced by dividing $D_L$ by $V_L$ with each of these quotients being substantially equal to $t_d+t_o$; velocity filter means coupled to said first means and selectively responsive to the detectable characteristics of said time-varying electrical signals for producing a second output signal only in response to at least one of said electrical signals having detectable characteristics corresponding to a magnitude of velocity falling within a specified limited range of velocity magnitudes, the upper limit of said range being $V_U$, while the lower limit of said range is $V_L$; integration and limiter means coupled to said velocity filter means and responsive to said time varying second output signal for controlling said variable distance means between its upper limit $D_U$ and lower limit $D_L$; fifth means operatively coupled to said variable distance and velocity filter means and responsive to said first and second output signals for producing a third output signal only upon at least partial time coincidence between said first and second output signals; and signal responsive timing means operatively coupled to said fifth means and responsive to said third output signal to produce a warning signal only in response to the continuation of said third output signal for a period of time substantially equal to $t_d$.

11. In a system for selectively producing a warning signal denoting only those substantial threats of collision, between a maneuverable craft and one of a plurality of different objects, which continues for a predetermined time of observation $t_o$ under conditions where the objects emanate detectable time-varying wave energy and the velocities and distances of the objects relative to said craft are conditionally different and where a specified advanced warning time $t_d$ is desired in order to allow successful execution of an evasion action for avoiding a threatened collision, the combination of: first means for detecting the wave energy emanated by said objects and transducing said detected energy into corresponding electrical signals, each of which has detectable time-varying characteristics which change in accordance with the magnitudes of relative velocity and distance between the craft and a corresponding object closing on said craft; variable distance means coupled to said first means and selectively responsive to the detectable characteristic of said time varying electrical signals for producing a first output signal only in response to those of said electrical signals whose detectable characteristics correspond to a magnitude of decreasing distance falling within a specified limit of range magnitudes, the upper limit $D_U$ of said range being substantially equal to $V_U(t_d+t_o)$, while the lower limit $D_L$ of said range is substantially equal to $V_U t_d$, the values of $V_U$, $V_L$, $D_U$ and $D_L$ being such that the quotient produced by dividing $D_U$ by $V_U$ is substantially equal to the quotient produced by dividing $D_L$ by $V_L$ with each of these quotients being substantially equal to $t_d+t_o$; velocity filter means coupled to said first means and selectively responsive to the detectable characteristics of said time varying electrical signals for producing a second output signal only in response to at least one of said electrical signals having detectable characteristics corresponding to a magnitude of velocity falling within a specified limited range of velocity magnitudes, the upper limit of said range being $V_U$, while the lower limit of said range is $V_L$; integration and limiter means coupled to said velocity filter means and responsive to the time varying second output signal for controlling said variable distance means between its upper limit $D_U$ and lower limit $D_L$; control reference means coupled to said variable distance means for providing said variable distance means with an initial bias to said upper limit; discriminator means operatively coupled to said variable distance means and velocity filter means and responsive to said first and second output signals for producing a third output signal only upon at least partial time coincidence between said first and second output signals; and signal responsive timing means operatively coupled to said discriminator means and responsive to said third output signal to produce a fourth output signal only in response to the continuation of said third output signal for a period of time substantially equal to $t_d$, indicating a threat of collision.

12. In a system for selectively producing a warning signal denoting only those substantial threats of collision, between a maneuverable craft and one of a plurality of different objects, which continues for a predetermined time of observation $t_o$ under conditions where the objects emanate detectable time-varying wave energy and the velocities and distances of the objects relative to said craft are conditionally different and where a specified advanced warning time $t_d$ is desired in order to allow successful execution of an evasion action for avoiding a threatened collision, the combination of: first means for detecting the wave energy emanated by said objects and transducing said detected energy into corresponding electrical signals, each of which has detectable time-varying characteristics which change in accordance with the magnitudes of relative velocity and distance between the craft and a corresponding object closing on said craft; variable distance means coupled to said first means and selectively responsive to the detectable characteristic of said time varying electrical signals for producing a first output signal only in response to those of said electrical signals whose detectable characteristics correspond to a magnitude of decreasing distance falling within a specified limit of range magnitudes, the upper limit $D_U$ of said range being substantially equal to $V_U(t_d+t_o)$, while the lower limit $D_L$ of said range is substantially equal to $V_U t_d$, the values of $V_U$, $V_L$, $D_U$, and $D_L$ being such that the quotient produced by dividing $D_U$ by $V_U$ is substantially equal to the quotient produced by dividing $D_L$ by $V_L$ with each of these quotients being substantially equal to $t_d+t_o$; velocity filter means coupled to said first means and selectively responsive to the detectable characteristics of said time varying electrical signals for producing a second output signal only in response to at least one of said electrical signals having detectable characteristics corresponding to a magnitude of velocity falling within a specified limited range of velocity magnitudes, the upper limit of said range being $V_U$, while the lower limit of said range is $V_L$; integration and limiter means coupled to said velocity filter means and responsive to the time varying second output signal for controlling said variable distance means between its upper limit $D_U$ and lower limit $D_L$; control reference means coupled to said variable distance means for providing said variable distance means with an initial bias to said upper limit; discriminator means operatively coupled to said variable distance means and velocity filter means and responsive to said first and second output signals for producing a third output signal only upon at least partial time coincidence between said first and second output signals; signal responsive timing means operatively coupled to said discriminator means and responsive to said third output signal to produce a fourth output signal only in response to the continuation of said third output signal for a period of time substantially equal to $t_d$, indicating a threat of collision; low guard means coupled to said first means and selectively responsive to the detectable characteristics of said time varying electrical signals for producing a guard output signal only in response to those electrical signals corresponding to objects within a minimum distance of said craft; and warning means coupled to said signal responsive timing means and said low guard means to provide a warning output signal in response to said fourth output signal and said guard output signal.

13. In a system for selectively producing a warning signal denoting a substantial threat of a collision between a maneuverable craft and one of a plurality of different objects from which emanates detectable time-varying wave energy, under conditions where the velocities and distances of the objects, relative to said craft, are conditionally different, the combination of: first means for detecting the wave energy emanated by said objects and transducing said detected energy into corresponding electrical signals each of which has detectable time-varying characteristics which change in accordance with the magnitudes of relative velocity and distance between the craft and a corresponding object closing on said craft; a first output terminal, means connected between said first means and said first output terminal and respectively responsive to those time-varying characteristics of said electrical signals which change in accordance with distance, to produce at said first output terminal a first output signal in turn having time-varying characteristics representing the magnitudes of velocities associated with only those objects whose distance from the craft fall within a specified range of distance magnitudes $D_1$ to $D_2$; a second output terminal, means connected between said first output terminal and said second output terminal and selectively responsive to those time-varying characteristics of said first output signal representing the velocities of objects to produce at said second output terminal a second output signal in turn having time-varying characteristics representing the magnitudes of velocities associated only with those objects having closing velocities, the magnitudes of which fall within a specified range of closing velocity magnitudes $V_1$ to $V_2$; means coupled to said second output terminal responsive to changes in the time-varying characteristics of said second output signal for producing a warning signal only in response to time-varying characteristics of said second output signal representing substantially constant values of velocities.

14. In a system for selectively producing a warning signal denoting a substantial threat of collision between a maneuverable craft and one of a plurality of different objects, pulsed Doppler radar system being carried by said craft and having a transmitter for producing pulsed signals and a receiver for receiving pulsed echo signals reflected by objects, under conditions where the velocities and distances of the objects, relative to said craft are conditionally different, the combination of: first means for detecting said pulsed echo signals reflected by the objects and transducing said detected echo signals into corresponding electrical signals which have detectable frequency components and detectable pulse components, the frequencies of said frequencies components changing in accordance with the magnitudes of relative velocity of objects closing on the craft and the timing of said pulsed components changing in accordance with the relative distances between the craft and the objects; a first output terminal; pulsed gate means connected between said first means and said first output terminal and selectively responsive to the timing of said pulsed components of said electrical signals to produce at said first output terminal a first output signal in turn having frequency components whose frequency values represent the velocities associated with only those objects whose distances from the craft fall within a specified range of distance magnitudes of $D_1$ to $D_2$, where $D_1$ is of lesser magnitude than $D_2$; a second output terminal; band pass filter means connected between said first output terminal and said second output terminal and selectively responsive to those frequency components of said first output signal representing the velocities of objects, to produce at said second output terminal, a second output signal in turn having frequency components whose frequency values represent the magnitudes of velocities associated with only those objects having closing velocities, the magnitudes of which fall within a specified range of closing velocity magnitudes $V_1$ to $V_2$, where $V_1$ is of lesser magnitude than $V_2$; a frequency discriminator coupled to said second output terminal responsive to changes in the frequency values of the frequency components of said second output signal for producing a warning signal only in response to those frequency components in said second output signal representing substantially constant magnitudes of velocity.

15. In a system for selectively producing a warning signal denoting a substantial threat of collision between a maneuverable craft and one of a plurality of different objects, pulsed Doppler radar system being carried by said craft and having a transmitter for producing pulsed signals and a receiver for receiving pulsed echo signals reflected by objects under conditions where the velocities and distances of the objects, relative to said craft are conditionally different, the combination of: first means for detecting said pulsed echo signals reflected by the objects and transducing said detected echo signals into corresponding electrical signals which have detectable frequency components and detectable pulse components, the frequencies of said frequency components changing in accordance with the magnitudes of relative velocity of objects closing on the craft and the timing of said pulse components changing in accordance with the relative distances between the craft and the objects; a first output terminal; pulsed gate means connected between said first means and said first output terminal and selectively responsive to the timing of said pulsed components of said electrical signals to produce at said first output terminal a first output signal in turn having frequency components whose frequency values represent the velocities associated with only those objects whose distance from the craft fall within a specified range of distance magnitudes of $D_1$ to $D_2$, where $D_1$ is of lesser magnitude than $D_2$; a second output terminal; band pass filter means connected between said first output terminal and said second output terminal and selectively responsive to those frequency components of said first output signal representing the velocities of objects, to produce at said second output terminal, a second output signal in turn having frequency components whose frequency values represent the magnitudes of velocities associated with only those objects having closing velocities, the magnitudes of which fall within a specified range of closing velocity magnitudes $V_1$ to $V_2$, where $V_1$ is of lesser magnitude than $V_2$; a frequency discriminator means coupled to said second output terminal responsive to changes in the frequency values of the frequency components of said second output signal for producing a warning output signal only in response to those frequency components in said second output signal representing substantially constant magnitudes of velocity; and controlled magnetic gating means coupled to said frequency discriminator for producing a threat of collision indication in response to said warning output signal.

16. In a system for selectively producing a warning signal denoting a substantial threat of collision between a maneuverable craft and one of a plurality of different objects, pulsed Doppler radar system being carried by said craft and having a transmitter for producing pulsed signals and a receiver for receiving pulsed echo signals reflected by objects, under conditions where the velocities and distances of the objects, relative to said craft are conditionally different, the combination of: first means for detecting said pulsed echo signals reflected by the objects and transducing said detected echo signals into corresponding electrical signals which have detectable frequency components and detectable pulse components, the frequency of said frequency components changing in accordance with the magnitudes of relative velocity of objects closing on the craft and the timing of said pulse components changing in accordance with the relative distances between the craft and the objects; a first output terminal; variable pulsed gate means connected between said first means and said first output terminal and selectively responsive to the timing of said pulsed components of said electrical signals to produce at said first output terminal a first output signal in turn having frequency components whose frequency values represent the velocities associated with only those objects whose distance from the craft fall within a specified range of distance magnitudes of $D_1$ to $D_2$, where $D_1$ is of lesser magnitude than $D_2$; a second output terminal; band pass filter means connected between said first output terminal and said second output terminal and selectively responsive to those frequency components of said first output signal representing the velocities of objects, to produce at said second output terminal, a second output signal in turn having frequency components whose frequency values represent the magnitudes of velocities associated with only those objects having closing velocities, the magnitudes of which fall within a specified range of closing velocity magnitudes $V_1$ to $V_2$, where $V_1$ is of lesser magnitude than $V_2$; a frequency discriminator means coupled to said second output terminal responsive to changes in the frequency values of the frequency components of said second output signal for producing a warning output signal only in response to those frequency components in said second output signal representing substantially constant magnitudes of velocity; controlled magnetic gating means coupled to said frequency discriminator for producing a threat of collision signal indication in response to said warning output signal and integration limiter means coupled to said frequency discriminator means and responsive to said warning output signal to provide a tracking input to said variable pulsed gating means for tracking only objects having signals of decreasing distance characteristics.

17. In a system for selectively producing a warning signal denoting a substantial threat of collision between a maneuverable craft and one of a plurality of different objects, pulsed Doppler radar system being carried by said craft and having a transmitter for producing pulsed signals and a receiver for receiving pulsed echo signals reflected by objects, under conditions where the velocities and distances of the objects, relative to said craft are conditionally different, the combination of: first means for detecting said pulsed echo signals reflected by the objects and transducing said detected echo signals into corresponding electrical signals which have detectable frequency components and detectable pulse components, the frequencies of said frequency components changing in accordance with the magnitudes of relative velocity of objects closing on the craft and the timing of said pulse components changing in accordance with the relative distances between the craft and the objects; a first output terminal; variable pulsed gate means connected between said first means and said first output terminal and selectively responsive to the timing of said pulsed components of said electrical signals to produce at said first output terminal a first output signal in turn having frequency components whose frequency values represent the velocities associated with only those objects whose distance from the craft fall within a specified range of distance magnitudes of $D_1$ to $D_2$, where $D_1$ is of lesser magnitude than $D_2$; a second output terminal; band pass filter means connected between said first output terminal and said second output terminal and selectively responsive to those frequency components of said first output signal representing the velocities of objects, to produce at said second output terminal, a second output signal in turn having frequency components whose frequency values represent the magnitudes of velocities associated with only those objects having closing velocities, the magnitudes of which fall within a specified range of closing velocity magnitudes $V_1$ to $V_2$, where $V_1$ is of lesser magnitude than $V_2$; a frequency discriminator means coupled to said second output terminal responsive to changes in the frequency values of the frequency components of said second output signal for producing a warning output signal only in response to those frequency components in said second output signal representing substantially constant magnitudes of velocity; controlled magnetic gating means coupled to said frequency discriminator for producing a threat of collision signal indication in response to said warning output signal; integration limiter means coupled to said frequency discriminator means and responsive to said warning output signal to provide a tracking input to said variable pulsed gating means for tracking only objects having signals of decreasing distance characteristics; and acceleration filter means coupled between said frequency discriminator means and said controlled magnetic gating means and responsive to said warning output signal from said frequency discriminator means to provide for a controlled magnetic gating means threat of collision signal output only when the rate of change of said warning signal output from said frequency discriminator means is substantially zero.

18. In a system for selectively producing a warning signal denoting a substantial threat of collision between a maneuverable craft and one of a plurality of different objects, pulsed Doppler radar system being carried by said craft and having a transmitter for producing pulsed signals and a receiver for receiving pulsed echo signals reflected by objects, under conditions where the velocities and distances of the objects, relative to said craft are conditionally different, the combination of: first means for detecting said pulsed echo signals reflected by the objects and transducing said detected echo signals into corresponding electrical signals which have detectable frequency components and detectable pulse components, the frequencies of said frequency components changing in accordance with the magnitudes of relative velocity of objects closing on the craft and the timing of said pulse components changing in accordance with the relative distances between the craft and the objects; a first output terminal; variable pulsed gate means connected between said first means and said first output terminal and selectively responsive to the timing of said pulsed components of said electrical signals to produce at said first output terminal a first output signal in turn having frequency components whose frequency values represent the velocities associated with only those objects whose distance from the craft fall within a specified range of distance magnitudes of $D_1$ to $D_2$, where $D_1$ is of lesser magnitude than $D_2$; a second output terminal; band pass filter means connected between said first output terminal and said second output terminal and selectively responsive to those frequency components of said first output signal representing the velocities of objects, to produce at said second output terminal, a second output signal in turn having frequency components whose frequency values represent the magnitudes of velocities associated with only those objects having closing velocities, the magnitudes of which fall within a specified range of closing velocity magnitudes $V_1$ to $V_2$, where $V_1$ is of lesser magnitude than $V_2$; a frequency discriminator means coupled to said second output terminal responsive to changes in the frequency values of the frequency components of said second output signal for producing a warning output signal only in response to those frequency components in said second output signal representing substantially constant magnitudes of velocity; controlled magnetic gating means coupled to said frequency discriminator for producing a threat of collision signal indication in response to said warning output signal; integration limiter means coupled to said frequency discriminator means and responsive to said warning output signal to provide a tracking input to said variable pulsed gating means for tracking only objects having signals of decreasing distance characteristics; acceleration filter means coupled between said frequency discriminator means and said controlled magnetic gating means and responsive to said warning output signal from said frequency discriminator means to provide for a controlled magnetic gating means threat of collision signal output only when the rate of change of said warning signal output from said frequency discriminator means is substantially zero; and observation timing means coupled between said frequency discriminator means and said controlled magnetic gating means and responsive to said warning output signal of said frequency discriminator means to provide for a controlled magnetic gating means threat of collision signal output only in response to a warning output signal of said frequency discriminator means which continues for a timing period $t_o$ established by said observation timing means.

19. In a system for selectively producing a warning signal denoting a substantial threat of a collision between a maneuverable craft and one of a plurality of different objects from which emanates detectable time-varying wave energy, under conditions where the velocities and distances of the objects, relative to said craft, are conditionally different, the combination of: first means for detecting the wave energy emanated by said objects and transducing said detected energy into corresponding electrical signals each of which has detectable time-varying characteristics which change in accordance with the magnitudes of relative velocity and distance between the craft and a corresponding object closing on said craft; second means coupled to said first means and selectively responsive to the time-varying characteristics of said electrical signals to produce a first output signal only in response to those of said electrical signals whose characteristics correspond to magnitudes of distances lying within a specified range of distance magnitudes $D_1$ to $D_2$ and magnitudes of velocities lying within a specified range of velocity magnitudes $V_1$ to $V_2$, where $D_1$ and $V_1$ are respectively of lesser magnitudes than $D_2$ and $V_2$; third means coupled to said first means and selectively responsive to the time-varying characteristics of said electrical signals to produce a second output signal only in response to those of said electrical signals whose characteristics correspond to magnitudes of distances lying within a specified range of distance magnitudes $D_3$ to $D_4$ and magnitudes of velocities lying within a specified range of velocity magnitudes $V_3$ to $V_4$, where $D_3$ and $V_3$ are respectively of lesser magnitudes than $D_4$ and $V_4$ respectively, $D_2$ is of lesser magnitude than $D_3$, and $V_2$ is of lesser magnitude than $V_4$ but not less than $V_3$ and $D_4/V_4$ is substantially equal to $D_2/V_2$; and fourth means coupled to said second and third means responsive to both said first and second output signals for producing a warning signal in response to the production of said first output signal and said second output signal, individually, whereby said warning signal will be produced at a time substantially not more than $D_4/V_3$ in advance of the arrival at the craft of those objects having closing velocity magnitudes lying in the range $V_1$ to $V_4$ upon entering the range of distance magnitudes $D_4$ to $D_1$.

20. In a system for selectively producing a warning signal denoting a substantial threat of a collision between a maneuverable craft and one of a plurality of different objects from which emanates detectable time-varying wave energy, under conditions where the velocities and distances of the objects, relative to said craft, are conditionally different, the combination of: first means for detecting the wave energy emanated by said objects and transducing said detected energy into corresponding electrical signals each of which has detectable time-varying characteristics which change in accordance with the magnitudes of relative velocity and distance between the craft and a corresponding object closing on said craft; second means coupled to said first means and selectively responsive to the time-varying characteristics of said electrical signals to produce a first output signal only in response to those of said electrical signals whose characteristics correspond to magnitudes of distances lying within a specified range of distance magnitudes $D_1$ to $D_2$ and magnitudes of substantially constant velocities lying within a specified range of velocity magnitudes $V_1$ to $V_2$, where $D_1$ and $V_1$ are respectively of lesser magnitudes than $D_2$ and $V_2$; third means coupled to said first means and selectively responsive to the time-varying characteristics of said electrical signals to produce a second output signal only in response to those of said electrical signals whose characteristics correspond to magnitudes of distances lying within a specified range of distance magnitudes $D_1$ to $D_2$ and magnitudes of substantially constant velocities lying within the specified range of velocity magnitudes $V_3$ to $V_4$, where $D_3$ and $V_3$ are respectively of lesser magnitudes than $D_4$ and $V_4$ respectively, $D_2$ is of lesser magnitude than $D_3$, and $V_2$ is of lesser magnitude than $V_4$ but not less than $V_3$, and $D_4/V_4$ is substantially equal to $D_2/V_2$; and fourth means coupled to said second and third means responsive to both said first and second output signals for producing a warning signal in response to the production of said first output signal and said second output signal, individually, whereby said warning signal will be produced at a time substantially not more than $D_4/V_3$ in advance of the arrival at the craft of those objects having substantially constant closing velocity magnitudes lying in the range of velocity magnitudes $V_1$ to $V_4$ upon entering the range of distance magnitudes $D_4$ to $D_1$.

21. In a system for selectively producing a warning signal denoting a substantial threat of a collision between a maneuverable craft and one of a plurality of different objects from which emanates detectable time-varying wave energy, under conditions where the velocities and distances of the objects, relative to said craft, are conditionally different, and a specified minimum advanced warning time, $W_{min}$, is desired in order to allow successful execution of an evasion action for avoiding a threatened collision, the combination of: first means for detecting the wave energy emanated by said objects and transducing said detected energy into corresponding electrical signals each of which has detectable time-varying characteristics which change in accordance with the magnitudes of relative velocity and distance between the craft and a corresponding object closing on said craft; a first output terminal; means connected between said first means and said first output terminal and selectively responsive to those time-varying characteristics of said electrical signals which change in accordance with distance, to produce at said first output terminal a first output signal in turn having time-varying characteristics representing the magnitudes of velocities associated with only those objects whose distance from the craft fall within a specified range of distance magnitudes $D_1$ to $D_2$ where $D_1$ is of lesser magnitude than $D_2$; a second output terminal; means connected between said first output terminal and said second output terminal and selectively responsive to those time-varying characteristics of said first output signal representing the velocities of objects, to produce at said second output terminal a second output signal in turn having time-varying characteristics representing the magnitudes of velocities associated only with those objects having closing velocities, the magnitudes of which fall within a specified range of closing velocity magnitudes $V_1$ to $V_2$, where $V_1$ is of lesser magnitude than $V_2$ and $D_2/V_2$ is substantially equal to $W_{min}+t_0$; means coupled to said second output terminal responsive to changes in the time-varying characteristics of said second output signal for producing a warning signal only in response to the time-varying characteristics of said second output signal representing a magnitude of substantially constant closing velocity which endures substantially continuously throughout a time period substantially equal in magnitude to $t_0$.

22. In a system for selectively producing a warning signal denoting a substantial threat of a collision between a maneuverable craft and one of a plurality of different objects from which emanates detectable time-varying wave energy, under conditions where the velocities and distances of the objects, relative to said craft, are conditionally different, the combination of: first means for detecting the wave energy emanated by said objects and transducing said detected energy into corresponding electrical signals each of which has detectable time-varying characteristics which change in accordance with the magnitudes of relative velocity and distance between the craft and a corresponding object closing on said craft; second means coupled to said first means and selectively responsive to the time-varying characteristics of said electrical signals to produce a second output signal only in response to those of said electrical signals whose characteristics correspond to magnitudes of distances lying within a specified range of distance magnitudes $D_1$ to $D_2$ and magnitudes of constant velocities lying within a fixed specified range of closing velocity magnitudes $V_1$ to $V_2$ respectively, where $D_1$ and $V_1$ are respectively of lesser magnitudes than $D_2$ and $V_2$; third controllable means coupled to said first means and selectively responsive to the time-varying characteristics of said electrical signals to produce a first output signal only in response to those of said electrical signals whose characteristics correspond to magnitudes of distances and velocities lying within a controllable range of distance magnitudes $d_3$ to $d_4$ and a fixed range of velocity magnitudes $V_3$ to $V_4$, wherein the difference $(d_4-d_3)$ between the magnitudes $d_3$ and $d_4$ is fixed, but the values of the magnitudes $d_3$ and $d_4$ are controllable and $d_3$ is always of less magnitude than $d_4$, and $V_3$ is of less magnitude than $V_4$ with the controllable value of $d_4$ being nominally established at a value $D_4$, $D_4$ being greater than $D_2$ and $V_3$ not greater than $V_2$ and $D_4/V_4$ is substantially equal to $D_2/V_2$; controlling means coupled to said third means and responsive to said first output signal for continuously reducing the value of $d_4$ from the nominal value $D_4$ to a value $D_3+(d_2-d_1)$ at a rate corresponding to a selected magnitude of velocity falling within the range of velocity magnitudes $V_1$ to $V_2$ where $D_3$ is greater than $D_2$ and less than $D_4$; fourth means coupled to said second and third means responsive to both said first and second output signals for producing a warning signal in response to the production of said first output signal and said second output signal, individually, whereby said warning signal will be produced at a time substantially not more than $D_4/V_4$ in advance of the arrival at the craft of those objects having closing velocity magnitudes lying in the range of velocity magnitudes $V_1$ to $V_4$ upon entering the range of distance magnitudes $D_4$ to $D_1$.

23. In a system for selectively producing a warning signal denoting a substantial threat of a collision between a maneuverable craft and one of a plurality of different objects from which emanates detectable time-varying wave energy, under conditions where the velocities and distances of the objects, relative to said craft, are conditionally different, the combination of: first means for detecting the wave energy emanated by said objects and transducing said detected energy into corresponding electrical signals each of which has detectable time-varying characteristics which change in accordance with the magnitudes of relative velocity and distance between the craft and a corresponding object closing on said craft; second means coupled to said first means and selectively responsive to the time-varying characteristics of said electrical signals to produce a first electrical output signal only in response to those electrical signals corresponding to objects whose distances from the craft are decreasing at a substantially constant rate; a first input terminal; a first output terminal; electrical signal responsive timing means connected between said first input terminal and said first output terminal for developing a second electrical output signal at said first output terminal only in response to the application to said first input terminal of an electrical signal, the duration of which is not less than a specified value of time fixed by said timing means; means coupling said second means to said first input terminal for applying said first electrical output signal to said first input terminal; a second input terminal and a second output terminal; means connected between said second input terminal and said second output terminal for developing a warning signal conditionally upon the application of an electrical signal applied to said second input terminal; and means coupling said first output terminal to said second input terminal for applying said second electrical output signal to said second input terminal whereby a warning signal will be developed only in response to those threats of collision which continue for at least a time period fixed by said electrical signal timing means.

24. In a system for selectively producing a warning signal denoting a substantial threat of a collision between a maneuverable craft and one of a plurality of different objects from which emanates detectable time-varying wave energy, under conditions where the velocities and distances of the objects, relative to said craft, are conditionally different, the combination of: first means for detecting the wave energy emanated by said objects and transducing said detected energy into corresponding electrical signals each of which has detectable time-varying characteristics which change in accordance with the magnitudes of relative velocity and distance between the craft and a corresponding object closing on said craft; second means coupled to said first means and selectively responsive to the time-varying characteristics of said electrical signals to produce a first output signal only in response to those of said electrical signals whose characteristics correspond to magnitudes of distances and velocities lying within the specified ranges of distance (D) and closing velocity (V) magnitudes $D_1$ to $D_2$ and $V_1$ to $V_2$ respectively where $D_1$ and $V_1$ are respectively of lesser magnitudes than $D_2$ and $V_2$; first electrical signal responsive timing means coupled to said second means and responsive to said first output signal to produce a second output signal only in response to the continued duration of said first output signal for a specified time period determined by said timing means; third means coupled to said first means and selectively responsive to the time-varying characteristics of said electrical signals to produce a third output signal only in response to those of said electrical signals whose characteristics correspond to magnitudes of distances and closing velocities lying within the specified ranges of distance (D) and closing velocity (V) magnitude $D_3$ to $D_4$ and $V_3$ to $V_4$ respectively where $D_3$ and $V_3$ are respectively of lesser magnitudes than $D_4$ and $V_4$ respectively, while $D_2$ is of lesser magnitude than $D_3$ and $V_2$ is of lesser magnitude than $V_4$ but $V_2$ is not less than $V_3$ and $D_4/V_4$ is substantially equal to $D_2/V_2$; second electrical signal responsive timing means coupled to said third means and responsive to said third output signal to produce a fourth output signal only in response to the continued duration of said third output signal for a specified time period determined by said second electrical signal responsive timing means; fifth means coupled to said first and second timing means responsive to both said second and fourth output signals for producing a warning signal in response to the production of said second output signal and said fourth output signal, individually, whereby said warning signal will be produced at a time not substantially more than $D_4/V_3$ in advance of the arrival of those objects having closing velocity magnitudes lying in the range $V_1$ to $V_4$ upon entering the range of distance magnitudes $D_4$ to $D_1$.

25. In a system for selectively producing a warning signal denoting a substantial threat of a collision between a maneuverable craft and one of a plurality of different objects from which emanate detectable time-varying wave energy, under conditions where the velocities and distances of the objects, relative to said craft, are conditionally different, the combination of: first means for detecting the wave energy emanated by said objects and transducing said detected energy into corresponding electrical signals each of which has detectable time-varying characteristics which change in accordance with the magnitudes of relative velocity and distance between the craft and a corresponding object closing on said craft; second means coupled to said first means and selectively responsive to the time-varying characteristics of said electrical signals to produce a first electrical output signal only in response to those of said electrical signals corresponding to objects whose distances and velocities constitute a threat of collision with the craft; a first input terminal; a first output terminal; electrical signal responsive timing means connected between said first input terminal and said first output terminal for developing a second electrical output signal at said first output terminal only in response to the application to said first input terminal of an electrical signal, the duration of which is not less than a specified value of time fixed by said timing means; means coupling said second means to said first input terminal for applying said first electrical output signal to said first input terminal; a second input terminal and a second output terminal; means connected between said second input terminal and said second output terminal for developing a warning signal conditionally upon the application of an electrical signal applied to said second input terminal; and means coupling said first output terminal to said second input terminal for applying said second electrical output signal to said second input terminal whereby a warning signal will be developed only in response to those threats of collision which continue for at least a time period fixed by said electrical signal timing means.

26. In a system for selectively producing a warning signal denoting a substantial threat of a collision between a maneuverable craft and one of a plurality of different objects from which emanate detectable time-varying wave energy, under conditions where the velocities and distances of the objects, relative to said craft, are conditionally different, the combination of: first means for detecting the wave energy emanated by said objects and transducing said detected energy into corresponding electrical signals each of which has detectable time-varying characteristics which change in accordance with the magnitudes of relative velocity and distance between the craft and a corresponding object closing on said craft; second means coupled to said first means and selectively responsive to the time-varying characteristics of said electrical signals to produce a first electrical output signal only in response to those electrical signals corresponding to objects whose distances from the craft are decreasing; a first input terminal; a first output terminal; electrical signal responsive timing means connected between said first input terminal and said first output terminal for developing a second electrical output signal at said first output terminal only in response to the application to said first input terminal of an electrical signal, the duration of which is not less than a specified value of time fixed by said timing means; means coupling said second means to said first input terminal for applying said first electrical output signal to said first input terminal; a second input terminal and a second output terminal; means connected between said second input terminal and said second output terminal for developing a warning signal conditionally upon the application of an electrical signal applied to said second input terminal; and means coupling said first output terminal to said second input terminal for applying said second electrical output signal to said second input terminal whereby a warning signal will be developed only in response to those threats of collision which continue for at least a time period fixed by said electrical signal timing means.

27. In a system for selectively producing a warning signal denoting a substantial threat of a collision between a maneuverable craft and one of a plurality of different objects from which emanate detectable time-varying wave energy, under conditions where the velocities and distances of the objects, relative to said craft, are conditionally different and at least a first one and a second one of the objects constitute collision threats respectively of a higher degree and a lower degree, the combination of: first means for detecting the wave energy emanated by said objects and transducing said detected energy into corresponding electrical signals each of which has detectable time-varying characteristics which change in accordance with the magnitudes of relative velocity and distance between the craft and a corresponding object closing on said craft; second means coupled to said first means and selectively responsive to the time-varying characteristics of said electrical signals to produce a first electrical output signal having time-varying characteristics in turn corresponding to the distance and velocity magnitudes of only those objects constituting substantial collision threats; third means coupled to said second means and selectively responsive to the time-varying characteristics of said first electrical output signal to produce a second electrical output signal only in response to those time-varying characteristics of said first electrical output signal corresponding to that object whose distance and velocity relative to the craft constitutes the higher degree of collision threat; a first input terminal and a first output terminal; electrical signal responsive timing means connected between said first input terminal and said first output terminal for developing a third electrical output signal at said first output terminal only in response to the application to said first input terminal of an electrical signal, the duration of which is not less than a specified value of time fixed by said timing means; means coupling said third means to said first input terminal for applying said second electrical output signal to said first input terminal; a second input terminal and a second output terminal; means connected between said second input terminal and said second output terminal for developing a warning signal conditionally upon the application of an electrical signal applied to said second input terminal; and means coupling said first output terminal to said second input terminal for applying said second electrical output signal to said second input terminal whereby a warning signal will be developed representing only those higher degrees of collision threats which continue for at least a time period fixed by said electrical signal timing means.

References Cited in the file of this patent

UNITED STATES PATENTS

| | | |
|---|---|---|
| 2,560,265 | Adler | July 10, 1951 |
| 2,774,064 | O'Neil | Dec. 11, 1956 |
| 2,804,160 | Rashid | Aug. 27, 1957 |

---

UNITED STATES PATENT OFFICE
CERTIFICATE OF CORRECTION

Patent No. 2,991,463             July 4, 1961

Emory Lakatos et al.

It is hereby certified that error appears in the above numbered patent requiring correction and that the said Letters Patent should read as corrected below.

Column 1, line 56, for "that for a craft" read -- for a craft that --; line 65, for "distance" read -- distances --; column 2, line 37, strike out "in a collision warning system"; column 3, line 52, for "to" read -- To --; column 11, line 32, for "in" read -- is --; column 15, line 46, after "objects" insert -- from --; column 23, line 70, for "frequency" read -- frequencies --.

Signed and sealed this 27th day of February 1962.

(SEAL)
Attest:

ERNEST W. SWIDER            DAVID L. LADD
Attesting Officer            Commissioner of Patents

UNITED STATES PATENT OFFICE
CERTIFICATE OF CORRECTION

Patent No. 2,991,463                                July 4, 1961

Emory Lakatos et al.

It is hereby certified that error appears in the above numbered patent requiring correction and that the said Letters Patent should read as corrected below.

Column 1, line 56, for "that for a craft" read -- for a craft that --; line 65, for "distance" read -- distances --; column 2, line 37, strike out "in a collision warning system"; column 3, line 52, for "to" read -- To --; column 11, line 32, for "in" read -- is --; column 15, line 46, after "objects" insert -- from --; column 23, line 70, for "frequency" read -- frequencies --.

Signed and sealed this 27th day of February 1962.

(SEAL)
Attest:

ERNEST W. SWIDER                                    DAVID L. LADD
Attesting Officer                                        Commissioner of Patents